(12) United States Patent
Raghavan et al.

(10) Patent No.: US 10,317,256 B2
(45) Date of Patent: Jun. 11, 2019

(54) MONITORING TRANSPORTATION SYSTEMS

(71) Applicant: Palo Alto Research Center Incorporated, Palo Alto, CA (US)

(72) Inventors: Ajay Raghavan, Mountain View, CA (US); Kyle Arakaki, Mountain View, CA (US); Andreas Schuh, San Francisco, CA (US); Alex Hegyi, San Francisco, CA (US); Peter Kiesel, Palo Alto, CA (US); Anurag Ganguli, Milpitas, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 123 days.

(21) Appl. No.: 15/488,021

(22) Filed: Apr. 14, 2017

(65) Prior Publication Data
US 2018/0299301 A1 Oct. 18, 2018

(51) Int. Cl.
*G01M 5/00* (2006.01)
*G01D 5/353* (2006.01)
(Continued)

(52) U.S. Cl.
CPC ........ *G01D 5/35387* (2013.01); *B61L 23/044* (2013.01); *B61L 23/045* (2013.01);
(Continued)

(58) Field of Classification Search
CPC .... G01D 5/35383; B61L 1/166; G01H 9/004; G01M 5/0033
See application file for complete search history.

(56) References Cited

U.S. PATENT DOCUMENTS

| 4,240,747 A | 12/1980 | Harmer |
| 5,660,944 A | 8/1997 | Sprengel et al. |

(Continued)

FOREIGN PATENT DOCUMENTS

| EP | 1324516 | 12/2005 |
| EP | 2492989 | 10/2013 |

(Continued)

OTHER PUBLICATIONS

Cao-Paz et al., "A Multi-Point Sensor Based on Optical Fiber for the Measurement of Electrolyte Density in Lead-Acid Batteries", Sensors 2010, 10, pp. 2587-2608.

(Continued)

*Primary Examiner* — Thanh Luu
(74) *Attorney, Agent, or Firm* — Hollingsworth Davis, LLC

(57) ABSTRACT

A monitoring system includes optical sensors disposed on one or more fiber optic waveguides. Each optical sensor is spaced apart from other optical sensors and is disposed at a location along a route defined by a transportation structure that supports a moveable conveyance. The plurality of optical sensors are mechanically coupled to one or both of the transportation structure and the moveable conveyance. Each optical sensor provides an optical output signal responsive to vibrational emissions of one or both of the transportation structure and the conveyance. The monitoring system includes a detector unit configured to convert optical output signals from the optical sensors to electrical signals. A data acquisition controller synchronizes recordation of the electrical signals with movement of the conveyance.

18 Claims, 27 Drawing Sheets

(51) Int. Cl.

| | | |
|---|---|---|
| B61L 23/04 | (2006.01) | |
| B61L 27/00 | (2006.01) | |
| G01M 11/08 | (2006.01) | |
| G01B 11/16 | (2006.01) | |
| G01L 1/24 | (2006.01) | |
| G01P 3/36 | (2006.01) | |

(52) U.S. Cl.
CPC .......... *B61L 27/0088* (2013.01); *G01B 11/18* (2013.01); *G01D 5/3539* (2013.01); *G01D 5/35351* (2013.01); *G01L 1/246* (2013.01); *G01L 1/247* (2013.01); *G01M 5/0008* (2013.01); *G01M 5/0025* (2013.01); *G01M 5/0033* (2013.01); *G01M 5/0041* (2013.01); *G01M 5/0066* (2013.01); *G01M 5/0091* (2013.01); *G01M 11/085* (2013.01); *G01P 3/36* (2013.01)

(56) References Cited

U.S. PATENT DOCUMENTS

| | | | |
|---|---|---|---|
| 5,949,219 A | 9/1999 | Weiss | |
| 5,995,686 A | 11/1999 | Hamburger et al. | |
| 6,051,437 A | 4/2000 | Luo et al. | |
| 6,265,100 B1 | 7/2001 | Saaski et al. | |
| 6,285,807 B1 | 9/2001 | Walt et al. | |
| 6,379,969 B1 | 4/2002 | Mauze et al. | |
| 6,828,055 B2 | 12/2004 | Kearl | |
| 7,135,342 B2 | 11/2006 | Colvin, Jr. et al. | |
| 7,155,075 B2 | 12/2006 | Rajendran et al. | |
| 7,263,246 B1 | 8/2007 | Duan et al. | |
| 7,306,951 B1 | 12/2007 | Benson et al. | |
| 7,310,153 B2 | 12/2007 | Kiesel et al. | |
| 7,315,667 B2 | 1/2008 | Schmidt et al. | |
| 7,427,782 B2 | 9/2008 | Daniels et al. | |
| 7,433,552 B2 | 10/2008 | Kiesel et al. | |
| 7,511,823 B2 | 3/2009 | Schultz et al. | |
| 7,522,786 B2 | 4/2009 | Kiesel et al. | |
| 7,589,312 B2 | 9/2009 | Kojima | |
| 7,695,970 B2 | 4/2010 | Parnas et al. | |
| 7,701,590 B2 | 4/2010 | Kiesel et al. | |
| 7,718,948 B2 | 5/2010 | Kiesel | |
| 7,766,544 B2 | 8/2010 | Shibuya et al. | |
| 8,097,352 B2 | 1/2012 | Fuse | |
| 8,143,070 B2 | 3/2012 | Tokhtuev et al. | |
| 8,148,165 B2 | 4/2012 | Nakano | |
| 8,241,911 B2 | 8/2012 | Ascheman et al. | |
| 8,268,493 B2 | 9/2012 | Cetegen et al. | |
| 8,437,582 B2 | 5/2013 | Kiesel | |
| 8,594,470 B2 | 11/2013 | Kiesel et al. | |
| 8,729,862 B2 | 5/2014 | Yebka et al. | |
| 8,808,890 B2 | 8/2014 | Fuse | |
| 9,000,718 B2 | 4/2015 | Park | |
| 9,203,122 B2 | 12/2015 | Raghavan et al. | |
| 9,553,465 B2 | 1/2017 | Raghavan et al. | |
| 9,583,796 B2 | 2/2017 | Saha et al. | |
| 2004/0033004 A1 | 2/2004 | Welch et al. | |
| 2005/0026134 A1 | 2/2005 | Miller et al. | |
| 2006/0045412 A1 | 3/2006 | Xiao et al. | |
| 2008/0019701 A1* | 1/2008 | Tam ........................ | B61L 1/166 398/141 |
| 2008/0089705 A1 | 4/2008 | Lu et al. | |
| 2008/0231836 A1 | 9/2008 | Curello et al. | |
| 2009/0027009 A1 | 1/2009 | Sievertsen | |
| 2009/0091759 A1 | 4/2009 | Pan et al. | |
| 2009/0220189 A1 | 9/2009 | Kiesel et al. | |
| 2009/0274849 A1 | 11/2009 | Scott et al. | |
| 2010/0032009 A1 | 2/2010 | Skryabin | |
| 2010/0192365 A1 | 8/2010 | Chow et al. | |
| 2010/0247027 A1 | 9/2010 | Xia et al. | |
| 2011/0081493 A1 | 4/2011 | Matsushita | |
| 2012/0232354 A1 | 9/2012 | Ecker et al. | |
| 2012/0321242 A1 | 12/2012 | Schade et al. | |
| 2013/0071739 A1 | 3/2013 | Tajima et al. | |
| 2013/0222811 A1* | 8/2013 | Handerek ......... | G01M 11/3127 356/477 |
| 2013/0312947 A1 | 11/2013 | Bandhauer et al. | |
| 2013/0314094 A1 | 11/2013 | Farmer et al. | |
| 2013/0316198 A1 | 11/2013 | Bandhauer et al. | |
| 2014/0072836 A1 | 3/2014 | Mills et al. | |
| 2014/0092375 A1 | 4/2014 | Raghavan et al. | |
| 2014/0203783 A1 | 7/2014 | Kiesel et al. | |
| 2014/0272493 A1 | 9/2014 | Evans et al. | |
| 2014/0312828 A1 | 10/2014 | Vo et al. | |
| 2014/0363747 A1 | 12/2014 | Evans et al. | |
| 2015/0214757 A1 | 7/2015 | Zane et al. | |
| 2015/0255824 A1 | 9/2015 | Evans et al. | |
| 2015/0321682 A1* | 11/2015 | Ernst ..................... | B61L 25/025 356/73.1 |
| 2016/0018319 A1 | 1/2016 | Hegyi et al. | |
| 2016/0334543 A1* | 11/2016 | Nagrodsky ............ | G01V 13/00 |

FOREIGN PATENT DOCUMENTS

| | | |
|---|---|---|
| JP | 63301470 | 12/1988 |
| WO | WO2013111698 | 8/2013 |
| WO | WO2014026093 | 2/2014 |
| WO | 2014152592 A1 | 9/2014 |

OTHER PUBLICATIONS

Chehura et al. "Temperature and strain discrimination using a single tilted fibre Bragg grating", Opt. Commun., vol. 275, No. 2, Jul. 2007, pp. 344-347.
Corbellini et al., "Modified POF Sensor for Gaseous Hydrogen Fluoride Monitoring in the Presence of Ionizing Radiations", IEEE Transactions on Instrumentation and Measurement, vol. 61, No. 5, May 2012, pp. 1201-1208.
Grobnic et al., "Sapphire Fiber Bragg Grating Sensor Made Using Femtosecond Laser Radiation for Ultrahigh Temperature Applications", IEEE Photonics Technology Letters, vol. 16, No. 11, Nov. 2004, p. 2505-2507.
Guan et al. "Simultaneous strain and temperature measurement using a single fibre Bragg grating", Electron. Lett.,vol. 36, No. 12, 2000, pp. 1018-1019.
Haase, "Strain Sensors Based on Bragg Gratings", IMEKO 20th TC3, 3rd TC16 and 1st TC22 International Conference Cultivating Metrological Knowledge, Nov. 27, 2007, 8 pages.
Jansen et al., "Low-Cost Flexible Packaging for High-Power Li-Ion HEV Batteries", FreedomCar & Vehicle Technologies Office, Jun. 2004, 56 pages.
Jin et al. "Geometric representation of errors in measurements of strain and temperature", Opt. Eng., vol. 36, No. 8, 1997, pp. 2272-2278.
Jin et al. "Simultaneous measurement of strain and temperature: error analysis". Opt. Eng . • vol. 36, No. 2, 1997. pp. 598-609.
Juergens et al., "Performance Evaluation of Fiber Bragg Gratings at Elevated Temperatures", NASA, Jan. 2004, 14 pages.
Kersey et al., "Fiber Grating Sensors", Journal of Lightwave Technology, vol. 15, No. 8, Aug. 1997, pp. 1442-1463.
Klein et al., "Optimal Charging Strategies in Lithium-Ion Battery", 2011 American Control Conference, Jun. 29-Jul. 1, 2011, pp. 382-387.
Koch et al., "Arrayed waveguide grating interrogator for fiber Bragg grating sensors: measurement and simulation", Applied Optics, vol. 51, No. 31, Nov. 1, 2012, pp. 7718-7723.
Kumai et al., "Gas Generation Mechanism Due to Electrolyte Decomposition in Commercial Lithium-Ion Cell", Journal of Power Sources 81-82, 1999, pp. 715-719.
Lee et al., "In Situ Monitoring of Temperature Inside Lithium-Ion Batteries by Flexible Micro Temperature Sensors", Sensors 2011, 11, pp. 9942-9950.
Li et al., "Preliminary Investigation of an SOI-based Arrayed Waveguide Grating Demodulation Integration Microsystem" Scientific Reports, May 6, 2014, 6 pages.
Liang et al., "Highly Sensitive Fiber Bragg Grating Refractive Index Sensors", Applied Physics Letters, vol. 86, 2005, pp. 151122-1-151122-3.

(56) References Cited

OTHER PUBLICATIONS

Merzbacher et al., "Fiber Optic Sensors in Concrete Structures: A Review", Smart Mater. Struct., 5, 1996, pp. 196-280.
Micron Optics, "Optical Fiber Sensors Guide", 21 pages.
Niewczas et al. "Performance Analysis of the Fiber Bragg Grating Interrogation System Based on an Arrayed Waveguide Grating", IEEE Transactions on Instrumentation and Measurement, vol. 53, No. 4, Aug. 2004, pp. 1192-1195.
Patrick et al. "Hybrid fiber Bragg grating/long period fiber grating sensor for strain/temperature discrimination", IEEE Photonics Technol. Lett., vol. 8, No. 9, 1996, pp. 1223-1225.
Pinson et al., Theory of SEI Formation in Rechargeable Batteries: Capacity Fade, Accelerated Aging and Lifetime Prediction, 223rd ECS Meeting, May 12-17, 2013, 29 pages.
Qi et al., "In Situ Observation of Strains During Lithiation of a Graphite Electrode", Journal of the Electrochemical Society, vol. 157 (6), 2010, pp. A741-A747.
Qin et al., "Specific Fluorescence Determination of Lithium Ion Based on 2-(2-hydroxyphenyl)benzoxazole", The Royal Society of Chemistry, 2001, pp. 1499-1501.
Rao: "In-fibre Bragg grating sensors", Meas. Sci. Technol., vol. 8, No. 4, Apr. 1997, pp. 355-375.
Reimers et al. "Electrochemical and In Situ X-Ray Diffraction Studies of Lithium Intercalation in Li x CoO2", Journal of the Electrochemical Society, 139 (8),1992.
Rodrigues et al., "A Review of State-of-Charge Indication of Batteries by Means of A.C. Impedance Measurements", Journal of Power Sources, vol. 87, 2000, pp. 12-20.
Roth et al., "Thermal Abuse Performance of 18650 Li-Ion Cells", Sandia Report, Mar. 2004, pp. 1-139.
Saha et al. "Battery Data Set", NASA Ames Prognostics Data Repository, 2007, Available online: http://tLarc.nasa.gov/tech/dash/pcoe/prognostic-data-repository/.
Sang et al., "Temperature-Insensitive Chemical Sensor Based on a Fiber Bragg Grating", Sensors and Actuators B 120, 2007, pp. 754-757.
Sethurman et al. "Surface structural disordering in graphite upon lithium intercalation/deintercalation", Journal of Power Sources 195 (2010) 3655-3660.
Siegel et al., "Neutron Imaging of Lithium Concentration in FLP Pouch Cell Battery", Journal of the Electrochemical Society, 158 (6), 2011, 8 pages.
Smith et al., "Power and Thermal Characterization of a Lithium-Ion Battery Pack for Hybrid-Electric Vehicles", Journal of Power Sources 160, 2006, pp. 662-673.
Tang et al., "Measurement of Chloride-Ion Concentration with Long-Period Grating Technology", Smart Mater. Struct. vol. 16, 2007, pp. 665-672.
Triollet et al. "Discriminated measures of strain and temperature in metallic specimen with embedded superimposed long and short fibre Bragg gratings", Meas. Sci. Technol., vol. 22, No. 1, Jan. 2011, pp. 015202.
Udd et al., "Fiber Optic Distributed Sensing Systems for harsh Aerospace Environments", 12 pages.
Van Steenkiste et al., "Strain and Temperature Measurement with Fiber Optic Sensors", 1997, 9 pages.
Wang et al., "Aging Effects to Solid Electrolyte Interface (SEI) Membrane Formation and the Performance Analysis of Lithium Ion Batteries", Int. J. Electrochem, Sci., 6, 2011, pp. 1014-1026.
Wang et al. "Simultaneous measurement of strain and temperature using dual-period fiber grating", Proc. SP!E, vol. 4579, 2001, pp. 265-268.
Wang et al. "Understanding Volume Change in Lithium-Ion Cells during Charging and Discharging Using In Situ Measurements", Journal of The Electrochemical Society, 154 (1), 2007.
Xu et al. "Discrimination between strain and temperature effects using dual-wavelength fibre grating sensors", Electron. Lett., vol. 30, No. 13, pp. 1085-1087, 1994.
Zhao et al. "Discrimination methods and demodulation techniques for fiber Bragg grating sensors", Opt. Lasers Eng., vol. 41, No. 1, pp. 1-18, Jan. 2004.
Zhou et al. "Simultaneous measurement for strain and temperature using fiber Bragg gratings and multimode fibers", Appl. Opt., vol. 47, No. 10, Apr. 2008, pp. 1668-1672.
Bellmann et al., "Compact and fast read-out for wavelength-encoded biosensors", Feb. 1, 2010, 7 pages.
Chuang et al., "Fiber Optical Sensors for High-Speed Rail Applications", Transportation Research Board of the National Academies, Aug. 2003, 40 pages.
Holcomb et al., "Feasibility Study of Fiber-Optic Technology for Broken Rail Detection", U.S. Department of Transportation, Oct. 2013, 26 pages.
Liu et al., "Analysis of Causes of Major Train Derailment and Their Effect on Accident Rates", Journal of the Transportation Research Board, No. 2289, 2012, pp. 154-163.
Magel, "Rolling Contact Fatigue: A Comprehensive Review", Transportation Research Board of the National Academies, Nov. 2011, 132 pages.
Mouawad, "Railroad Agency Details New Rail-Track Standards", The New York Times, Oct. 9, 2015, 3 pages.
Saha et al., "Model-Based Approach for Optimal Maintenance Strategy", European Conference of the Prognostics and Health Management Society, 2014, pp. 1-5.
Schuh et al., "High-resolution, high-frequency wavelength shift detection of optical signals with low-cost compact readouts", Fiber Optic Sensors and Applications XII, Proc. of SPIE, vol. 9480, 2015, 7 pages.
Scruby, "An introduction to acoustic emission", Journal of Physics E: Scientific Instruments, vol. 20, 946, 1987.
Walker et al., "Acoustic Bearing Detectors and Bearing Failures", Technology Digest, TD-07-024, Sep. 2007, 4 pages.
EP Search Report from EP App. No. 18168635.3 dated Sep. 10, 2018, 6 pages.

\* cited by examiner

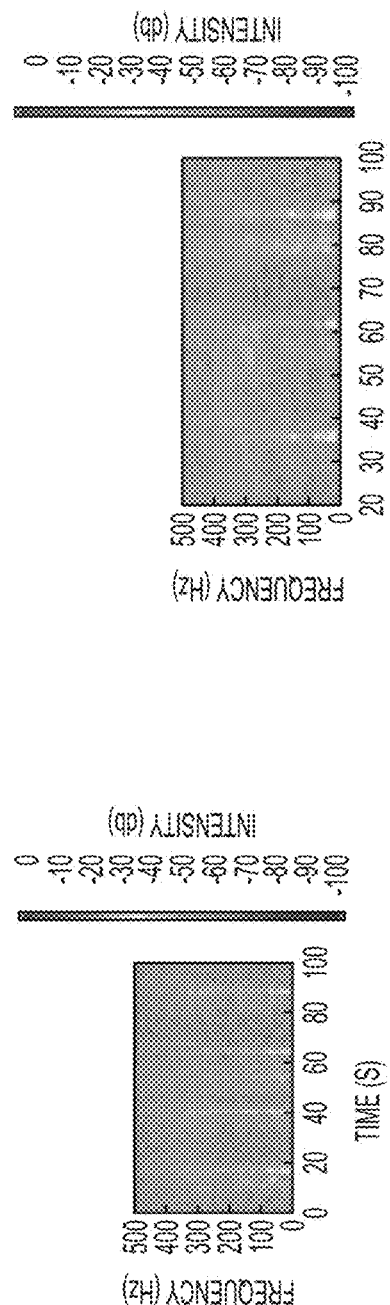
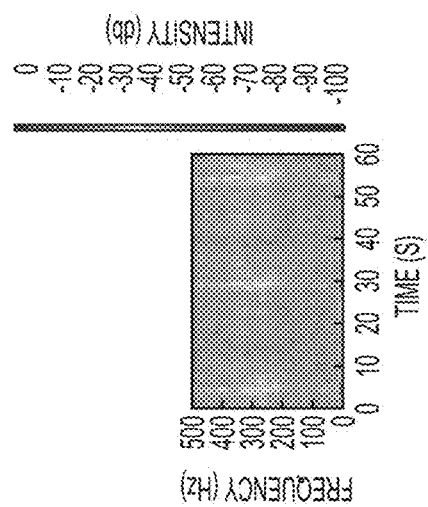
FIG. 18A
FIG. 18B
FIG. 18C

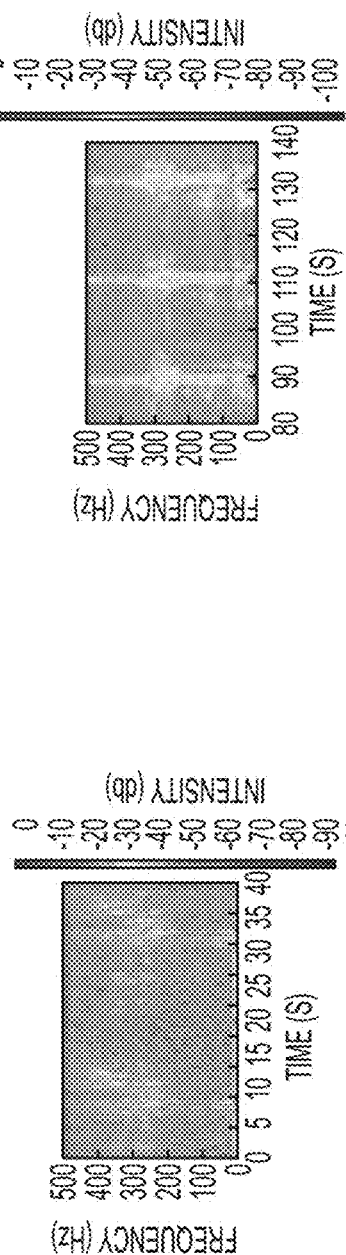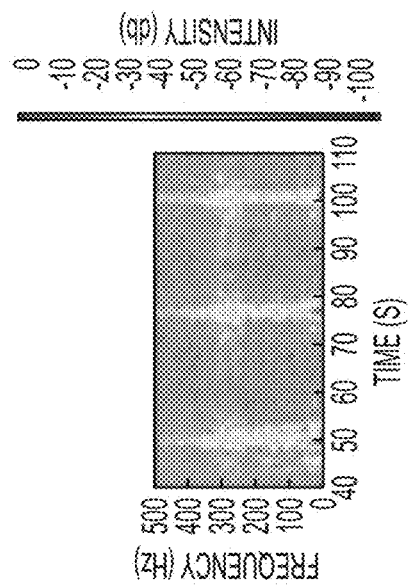

MONITORING TRANSPORTATION SYSTEMS

TECHNICAL FIELD

This application relates generally to techniques for monitoring transportation systems for detection, quantification, and/or classification of the state of the system. The application also relates to components, devices, systems, and methods pertaining to such techniques.

BACKGROUND

Degradation in transportation systems, including railroads and bridges, can develop due to insufficient maintenance, manufacturing defects, the environment, and operating conditions such as load, speed, environmental stresses, etc. Degradation of transportation systems can lead structural failures, derailments and accidents.

SUMMARY

Embodiments described herein are directed to approaches for monitoring a transportation system. A monitoring system includes a plurality of optical sensors disposed on one or more fiber optic waveguides. Each optical sensor is spaced apart from other optical sensors of the plurality of optical sensors and is disposed at a location along a route defined by a transportation structure that supports a moveable conveyance as the conveyance moves along the transportation structure. The plurality of optical sensors are mechanically coupled to one or both of the transportation structure and the moveable conveyance. Each optical sensor provides an optical output signal responsive to vibrational emissions of one or both of the transportation structure and the conveyance. The monitoring system includes a detector unit configured to convert optical output signals from the optical sensors to electrical signals. A data acquisition controller synchronizes recordation of the electrical signals with movement of the conveyance.

According to some embodiments, the monitoring system may further include a processor configured to detect a condition of at least one of the transportation structure and the conveyance based on data acquired from the electrical signals.

Some embodiments are directed to a method of monitoring a transportation system. The method includes receiving optical output signals from one or more optical sensors. Each optical sensor is disposed at a location along a route defined by a transportation structure that supports a moveable conveyance as the conveyance moves along the transportation structure. The optical sensors are mechanically coupled to one or both of the transportation structure and the moveable conveyance. Each optical output signal is responsive to vibrational emissions of one or both of the transportation structure and the conveyance. The optical output signals are converted to electrical signals. Data acquisition of the electrical signals is synchronized with movement of the conveyance along the transportation structure.

BRIEF DESCRIPTION OF THE DRAWINGS

FIGS. 18A through 18F show spectrograms of the vibrational emissions as the train passes over the track which correspond to the electrical signals of FIGS. 17A through 17F.

The figures are not necessarily to scale. Like numbers used in the figures refer to like components. However, it will be understood that the use of a number to refer to a component in a given figure is not intended to limit the component in another figure labeled with the same number.

DESCRIPTION

Figure 1:
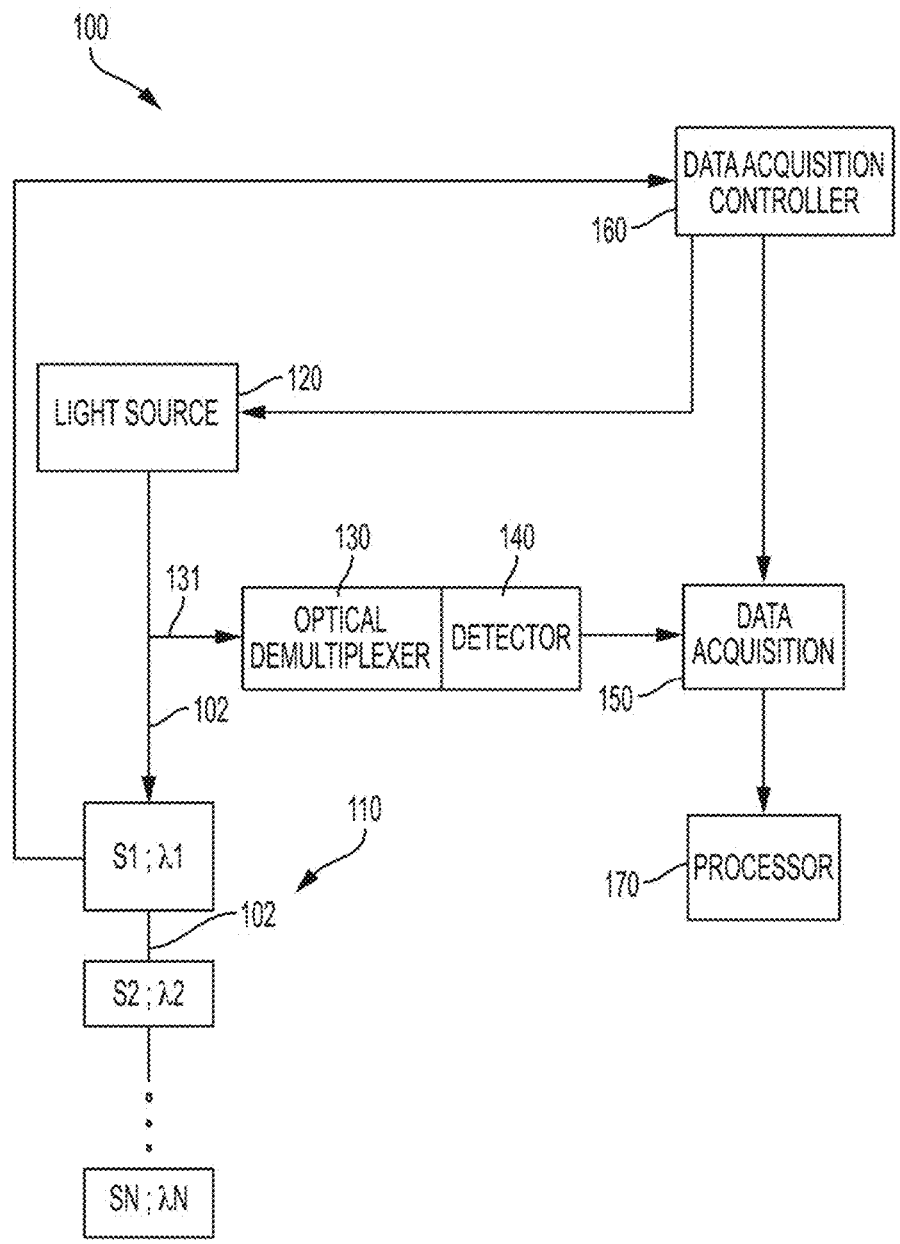
FIG. 1 shows a general block diagram of an optical system that can be used to monitor a transportation system according to embodiments described herein.

Embodiments described in this disclosure involve optically-based monitoring for transportation systems. Approaches discussed herein can be applied to transportation systems that include moveable conveyance that is supported by a transportation structure as the conveyance moves along the transportation structure. Examples of transportation structures can include railroads, automotive bridges and roadways, tramways, and/or conveyors. Examples of conveyances can include railroad cars, automobiles, trams, and/or containers or packages that can be moved by a conveyor. Optical-based monitoring can be used to detect various conditions of the transportation system, such as degradation, failures, and/or loading of the transportation structure and/or conveyance.

The approaches discussed herein can be used for a variety of transportation systems and may be particularly useful in railroad applications. Broken rails and broken railroad car wheels are leading causes of derailment incidents, with broken rains being responsible for one third of U.S. railroad accidents each year. During the past 50 years, heavier axle loads and increased train traffic and speeds in the North American railroad industry have caused the wheel/rail contact environment to become increasingly strenuous. The strenuous environment has led to increased wear and rolling contact fatigue, decreased rail life, and higher maintenance costs. Worn rails can also cause a considerable increase in fuel consumption, braking distance, lateral forces, noise, and/or wheel wear rates. Reliable early detection of rolling contact fatigue can enable proactive maintenance and prevent many of the rail accidents that occur each year.

The approaches disclosed herein enable comprehensive real-time performance monitoring of transportation systems using high resolution data gathered by optical sensors to detect and quantify the extent of specific degradations and failures of a transportation system. The approaches also provide for gathering other information about the transportation system, such as speed, weight and/or load distribution of conveyances. In various scenarios, characteristics of one or both of the transportation structure and the conveyance supported by the transportation structure can be identified and/or quantified.

Conventional maintenance of transportation structures typically requires a vehicle and/or person to carry out nondestructive test methods on-site to detect internal flaws in the structure. Such tests may include ultrasound, eddy current inspection, magnetic particle inspection, radiography, and more. Embodiments described herein provide for effective remote railway monitoring with an acceptable level of resolution and cost.

The monitoring systems of the present disclosure comprise fiber optic sensors which are mechanically coupled to the transportation system. The fiber optic sensors are configured to sense vibrational emissions of the transportation structure and/or conveyance as the conveyance moves over the transportation structure. The vibrational emissions can include acoustic emissions, longitudinal/transverse stress, and/or other types of vibration signals. The high resolution vibrational data collected by the sensors can be used by pattern matching algorithms to identify specific degradations, failures, load levels, load conditions, and/or other information about the transportation structures and/or conveyances. For example, the patterns of the vibrational emission data collected by the monitoring system may indicate a fractured or degraded rail of a railroad, railcar faults, such as wheel flats, hot bearings, truck warp, and/or hunting oscillation of the railcar. The pattern of vibrational emission data may indicate the distribution of automobiles on a bridge or the weight of a package carried by conveyor. The pattern of vibrational emission data may be used to verify waybill information such as load, velocity, and axles of the conveyance. The examples provided above are exemplary and not comprehensive as the vibrational data may include additional information about the transportation system.

The monitoring approaches described herein enable remote monitoring of various types of transportation systems which can reduce the cost and downtime associated with conventional on-site inspection. The monitoring approaches can enhance predictive maintenance of transportation systems. Identifying failures and/or degradation of transportation structures can reduce derailments, bridge failure, accidents, downtime, and other catastrophic events.

Embodiments discussed herein include a number of optical sensors located in proximity to and spaced apart along a transportation structure. The optical sensors are mechanically coupled to the transportation structure and/or to a conveyance that is moving along the transportation structure. In some embodiments, the optical sensors are sensitive to the vibrational emissions of the transportation structure and/or the conveyance as the conveyance moves along the structure in the vicinity of the sensors. The optical sensors may comprise any type (or multiple types) of optical sensor, including fiber Bragg grating (FBG) sensors and/or etalon or Fabry-Perot (FP) sensors. Both the FBG and etalon/FP sensors are collectively referred to herein as optical sensors. Although examples provided below are based on FBG sensors, it will be understood that other types of optical sensors could alternatively or additionally be used in these and other embodiments.

According to embodiments discussed herein, the monitoring system can include a high resolution wavelength shift detector to monitor the output of the optical sensors and to convert the optical signals of the sensors to electrical signals. The electrical signals that represent the vibrational emissions emitted by the transportation structure and/or conveyance can be recorded, e.g., acquired and stored, with high resolution using the wavelength shift detector as discussed in more detail below.

One concern with monitoring vibrational emissions in a distributed sensing system is that a large amount of data can be generated in a small amount of time due to the high sampling rate required for hundreds of sensors. To remedy this, embodiments described herein may include a data acquisition (DA) controller configured to control the sensors from which data are acquired. The DA controller can limit the number of sensors from which data is collected to a number of sensors that are within a predetermined distance from the conveyance as the conveyance moves along the transportation structure. Selection of the sensors from which data are acquired relies on detection of the presence of a passing conveyance and the speed of the passing conveyance.

FIG. 1 is a block diagram of a monitoring system 100 in accordance with some embodiments. The system 100 includes a plurality of optical sensors 110, e.g., S1, S2, . . . , SN disposed on and spaced apart from one another on one or more optical waveguides 102, e.g., fiber optic cables. Each optical sensor 110 is disposed at a location along a route defined by a transportation structure that supports a moveable conveyance as the conveyance moves along the transportation structure. (The transportation structure and conveyance are not shown in FIG. 1.) Each optical sensor 110 is mechanically coupled to one or both of the transportation structure and the moveable conveyance as the conveyance moves in the vicinity of an optical sensor 110.

An excitation light source 120 provides excitation light to the optical sensors 110. The optical sensors S1, S2, . . . SN are respectively configured to reflect light at a characteristic wavelength (or wavelength band) $\lambda_1, \lambda_2 \ldots \lambda_N$. The excitation light source provides excitation light that includes the wavelength bands of the sensors. As the conveyance passes near the sensors 110, vibrational emissions caused by the conveyance moving over the transportation structure causes the wavelength of the light reflected from the sensors 110 to shift from the characteristic wavelength.

The reflected output light from the optical sensors 110 in the different wavelength ranges is separated (demultiplexed) by an optical demultiplexer 130. The optical demultiplexer 130 spatially disperses light from the sensors S1, S2, . . . SN carried on optical waveguide 102 according to the wavelength of the light. In various implementations, the optical demultiplexer 130 may comprise a linear variable transmission structure and/or an arrayed waveguide grating, for example.

The demultiplexed light from the optical sensors 110 falls on a detector unit 140 which converts the demultiplexed output light from the sensors to electrical signals. The electrical signals include information about the characteristics of the transportation system. The transportation system characteristics can be extracted by processor 170 which matches the patterns of the signals to known patterns associated with certain characteristics. For example, the processor 170 may be programmed to identify a fracture in the transportation structure by comparing the pattern of the electrical signals obtained from the sensors 110 to a known pattern of the signals that indicate a fracture.

The wavelength bands $\lambda_1, \lambda_2 \ldots \lambda_N$ of the sensors S1, S2, . . . SN may be selected so that the wavelength band of one sensor does not substantially overlap with the wavelength bands of the other sensors. In some embodiments, the optical sensors S1, S2, . . . SN are optically coupled to a broadband light source 120 that supplies excitation light across a broad wavelength band that spans the operating wavelength bands of the optical sensors S1, S2, . . . SN. Output light from optical sensors S1, S2, . . . SN is carried on sensor waveguide fiber optic cable 102 to the input waveguide 131 of the optical demultiplexer 130. The optical demultiplexer 130 spatially disperses light from the sensors S1, S2, . . . SN carried on input waveguide 131. In various implementations, the optical demultiplexer 130 may comprise a linear variable transmission structure and/or an arrayed waveguide grating, for example.

The output of the optical demultiplexer 130 is optically coupled to the detector unit 140 which includes multiple photodetectors. Each photodetector is configured to generate an electrical signal in response to the demultiplexed light that falls on a light sensitive surface of the photodetector. The electrical signals generated by the photodetectors of the detector unit 140 represent the vibrational emissions from the transportation structure.

In some implementations, the detector unit 140 includes at least N photodetectors. In some implementations, the detector unit 140 includes at least N pairs of photodetectors. Each of these implementations is discussed in more detail below. An additional photodetector may be used to monitor intensity of the input light, e.g., by tapping off the input waveguide 131.

Referring again to FIG. 1, excitation light from the light source 110 travels through the 102 to the sensors S1, S2, . . . SN. The input light interacts with the FBG sensors S1, S2, . . . SN that are spaced apart along the waveguide 102. Each optical sensor reflects a portion of the input light, and the reflected light is referred to as output light emanating from the optical sensor. The output light from all sensors travels through the waveguide 102 to the input waveguide 131 of the optical demultiplexer 130.

Fiber Bragg grating sensors can be formed by a periodic modulation of the refractive index along a finite length (typically a few mm) of the core of a fiber optic cable. This pattern reflects a wavelength, called the Bragg wavelength, that is determined by the periodicity of the refractive index profile of the FBG sensor. In practice, the sensor typically reflects a narrow band of wavelengths centered at the Bragg wavelength. The Bragg wavelength at a characteristic or base value of the external stimulus is denoted $\lambda$, and light having a peak, center, or centroid wavelength $\lambda$ (and a narrow band of wavelengths near $\lambda$) is reflected from a sensor when it is in a predetermined base condition corresponding to low or no vibrational emissions from the transportation structure. When the sensor is subjected to vibrational emissions from the transportation structure, the vibrational emissions change the periodicity of the grating and the index of refraction of the FBG sensor, and thereby alter the reflected light so that the reflected light has a peak, center, or centroid wavelength, $\lambda_s$, different from the base wavelength, $\lambda$. The resulting wavelength shift, $\Delta\lambda=(\lambda-\lambda_s)/\lambda$ is a measure of the vibrational emissions. FBG-based sensing allows for incorporating multiple sensors, e.g., about 64 sensors, on a single waveguide 102. In some approaches, each of the sensors S1, S2, . . . SN can be individually interrogated through wavelength domain multiplexing and demultiplexing. In some approaches, sensors disposed in multiple sensor modules can be individually interrogated through a combination of time domain multiplexing and wavelength domain multiplexing and demultiplexing.

The transportation monitoring system 100 includes a data acquisition controller 160 configured to control the vibrational emission data that is collected by the data acquisition unit 150. In some embodiments, the data acquisition controller 160 may control the excitation light source 120 so that only a preselected set of sensors receive excitation light during a particular time window when the conveyance is moving near the selected sensors. In some embodiments, the excitation light source emits light that excites many or all sensors, but the data acquisition controller 160 selectively records electrical signals only from the sensors that are near the moving conveyance while ignoring electrical signals from other sensors that are farther from the moving conveyance. By either of these techniques, the data acquisition controller 160 can limit the collection of vibrational emission data associated with a particular optical sensor to a time window during which the conveyance is within a predetermined distance from the location of the optical sensor. In this way, the data acquisition controller synchronizes the collection of vibrational emission data with the movement of the conveyance along the transportation structure. Limiting the amount of data collected to only relevant sensors near the moving conveyance while not collecting irrelevant data from sensors farther away from the conveyance allows for better allocation of resources to facilitate the collection of high resolution, high frequency sensor data.

Figure 2A:
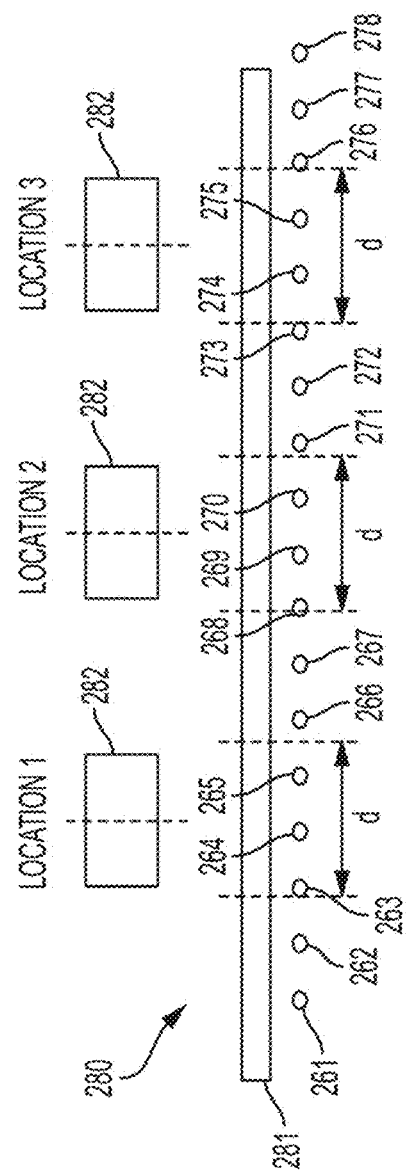
FIG. 2A is a diagram illustrating synchronization of movement of the conveyance with sensors from which electrical signals are collected in accordance with some embodiments.

FIG. 2A shows a transportation system 280 including a transportation structure 281 and a conveyance 282 that moves along the structure 281 and is shown at three different locations. Sensors 261-278 are disposed at spaced apart locations along the transportation structure 281. FIG. 2A shows the conveyance 282 at a first, second, and third of locations Location 1, Location 2, Location 3 as the conveyance moves along the transportation structure 281. When the conveyance 282 is at the Location 1, sensors 263, 264, 265 are within a predetermined distance, d, of the conveyance 282 and the monitoring system collects data from sensors 263, 264, 265 and does not collect data from sensors 261, 262, 266-278. When the conveyance 282 is at Location 2, sensors 269, 270 are within the predetermined distance, d, of the conveyance 282 and the monitoring system collects data from sensors 269, 270 and does not collect data from sensors 261-267, 271-278. The system may or may not collect data from sensor 268 which is on the boundary line. When the conveyance 282 is at Location 3, sensors 274, 275 are within the predetermined distance, d, of the conveyance 282 and the monitoring system collects data from sensors 274, 275 and does not collect data from sensors 261-273, 276-278.

Figure 2B:
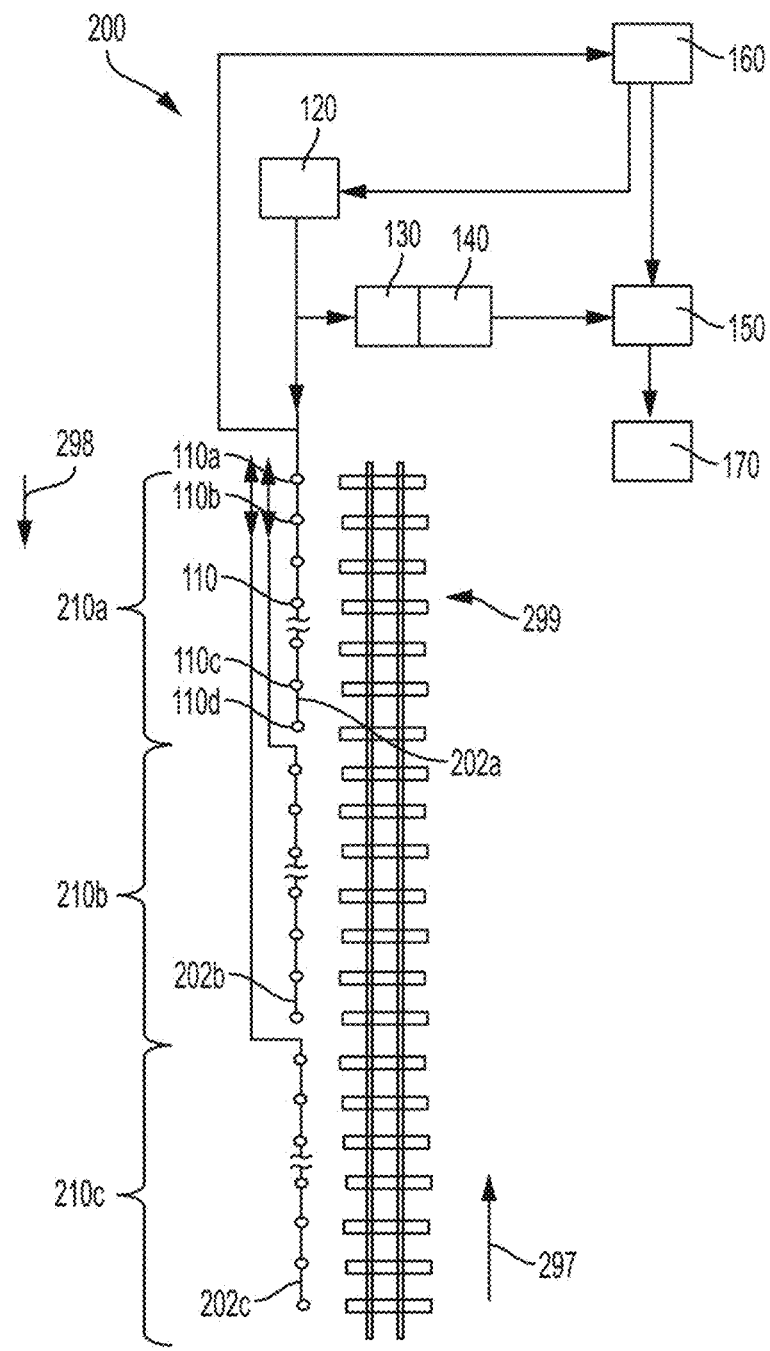
FIG. 2B is a diagram illustrating a monitoring system that includes multiple sensor modules in accordance with some embodiments.

FIG. 2B is a conceptual diagram showing a monitoring system 200 in accordance with some embodiments. As shown in FIG. 2B, the sensors 110 are arranged in three sensor modules 210a, 210b, 210c. The sensor modules 210a, 210b, 210c are coupled in parallel to the excitation light source 120 and to the optical demultiplexer 130. Each sensor module 210a, 210b, 210c includes multiple optical sensors 110 arranged in a series configuration along an optical waveguide 202a, 202b, 202c. The sensors 110 are spaced apart along the transportation structure 299. As the conveyance (not shown in FIG. 2A) moves along the transportation structure 299, data acquisition controller 160 shifts collection of data from one sensor array to another sensor array and/or between one group of sensors within a sensor array to another group of sensors within the same sensor array.

For example, if the conveyance is moving in the direction indicated by arrow 298, the data acquisition controller 160 shifts collection of data from sensor module 210a to sensor module 210b to sensor module 210c in synchrony with the movement of the conveyance. If the conveyance is moving in the direction indicated by arrow 297, the data acquisition controller 160 shifts collection of data from sensor module 210c to sensor module 210b to sensor module 210a.

In some embodiments, the data acquisition controller 160 determines the position and speed of the conveyance based on a first set of sensors in the sensor module, e.g., at least two sensors, such as sensors 110a and 110b. As a train or other conveyance passes over FBG sensor 110a, the vibrational emissions picked up by the sensor 110a cause the reflected wavelength of sensor 110a to shift by a threshold value. When the threshold value is met for two physically separated FBGs, 110a, 110b, the speed and direction of the conveyance can be determined. Based on the speed and direction of the conveyance, the data acquisition controller 160 determines a second set of FBGs of the plurality of FBGs which will be actively monitored. The electrical signals of the set of actively monitored FBGs are recorded by the data acquisition unit 150. The data acquisition controller 160 may make adjustments in the speed and/or position of the conveyance based on information from additional sensors. In some embodiments the same sensors can be used to detect the speed and position of the conveyance and to monitor the operational state of the transportation structure, e.g., monitoring for a normal or abnormal operational state. An abnormal operational state of the transportation structure may include fractures, degradation, anomalous loading, etc. For example, a normal operational state of the transportation structure may include normal load level, normal load distribution, gap levels near joints, track/tram restraint torque levels, humidity/temperature levels, etc. An abnormal operational state of the transportation structure may include cracks, breaks, anomalous or over load level, anomalous load distribution, rolling fatigue, corrosion, abrasion, wear, structural buckling, and other faults. A normal operational state of the moveable conveyance structure may include normal load level, normal load distribution, speed, load levels to inform tolls due to operators, axle/railcar counts, train length, etc. An abnormal operational state of the conveyance may include cracks, breaks, anomalous load level, anomalous load distribution, rolling fatigue, corrosion, abrasion, wear, structural buckling, and other faults. In some embodiments, a sensor module includes a first set of sensors dedicated for determining speed and position and a second set of sensors dedicated to monitor the operational state of the transportation system.

Figure 2C:
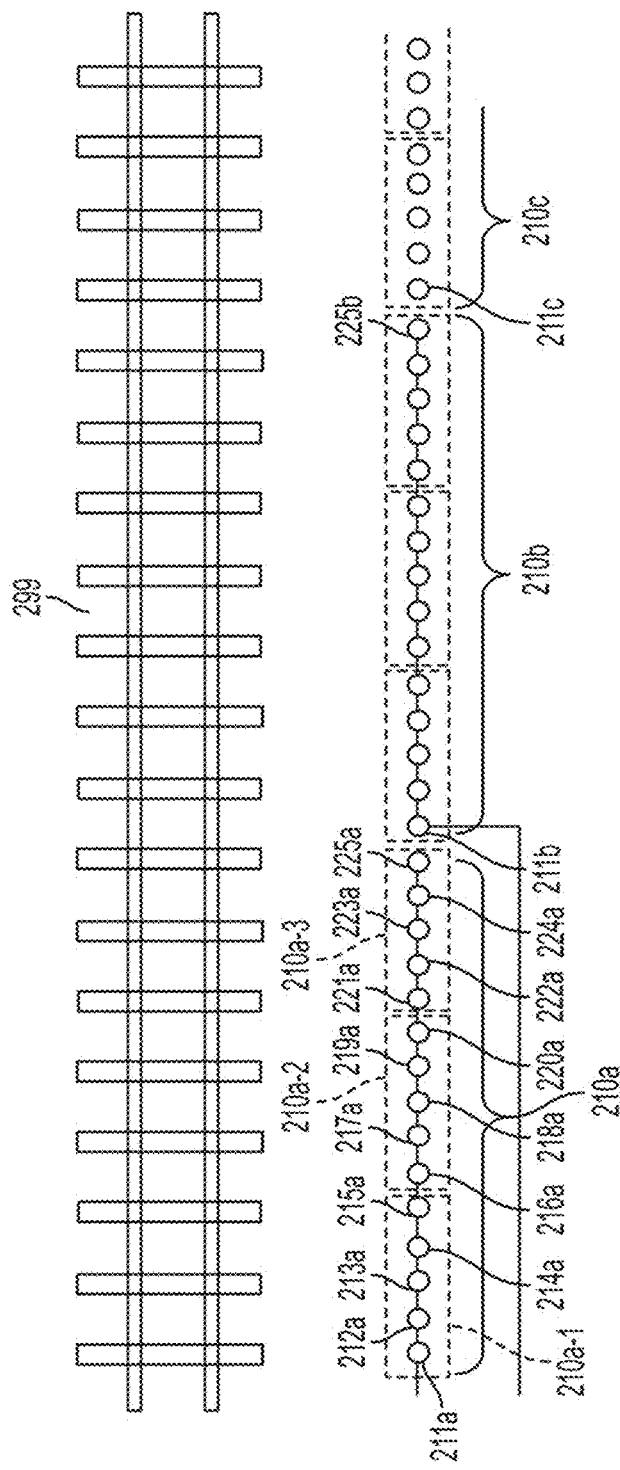
FIG. 2C illustrates synchronizing data acquisition with time of flight of sensor signals in accordance with some embodiments.

In some embodiments, the time of flight of the light reflected by the sensors may be used to control the data acquisition from the optical sensors so as to synchronize the data collection with the movement of the conveyance. FIG. 2C shows sensor array 210a that includes sensors 211a-225a wherein sensors 211a-215a are grouped in a first group, sensors 216a-220a are in a second group, and sensors 221a-225a are in a third group. The distance between the first group of sensors and the detector unit is less than the distances between the second and third groups of sensors and the detector unit, so it takes less time for the light reflected from the first sensors to reach the detector unit when compared to the time it takes for reflected light from the second and third groups of sensors to reach the detector unit.

Reflected light from the first group of sensors 211a-215a arrives at the optical demultiplexer 130 during time period $t_1$, reflected light from the second group of sensors 216a-220a arrives at the optical demultiplexer 130 during time period $t_2 > t_1$, reflected light from the third group of sensors 221a-225a arrives at the optical demultiplexer 130 during time period $t_3 > t_2 > t_1$. Each sensor in a group of sensors may have a different characteristic wavelength from other sensors in the same group. In some embodiments, sensors 211a, 216a, and 221a all have characteristic wavelength $\lambda_1$, the sensors 212a, 217a, and 222a all have a characteristic wavelength $\lambda_2 \neq \lambda_1$, sensors 213a, 218a, and 223a all have characteristic wavelength $\lambda_3 \neq \lambda_2 \neq \lambda_1$, sensors 214a, 219a, and 224a all have characteristic wavelength $\lambda_4 \neq \lambda_3 \neq \lambda_2 \neq \lambda_1$, and sensors 215a, 220a, and 225a, all reflect light in wavelength band $\lambda_5 \neq \lambda_4 \neq \lambda_3 \neq \lambda_2 \neq \lambda_1$. Thus, the data acquisition controller 160 can synchronize data collection with movement of the conveyance using both wavelength demultiplexing according to the wavelength band of the light reflected by the optical sensors and time demultiplexing according to the time of flight of optical sensors signals. After the electrical signal data generated by the detector unit 140 is collected, the monitoring system processor 170 determines the state of the transportation structure by matching the pattern of the electrical signals collected by the data acquisition unit to a known pattern.

Figure 3A:
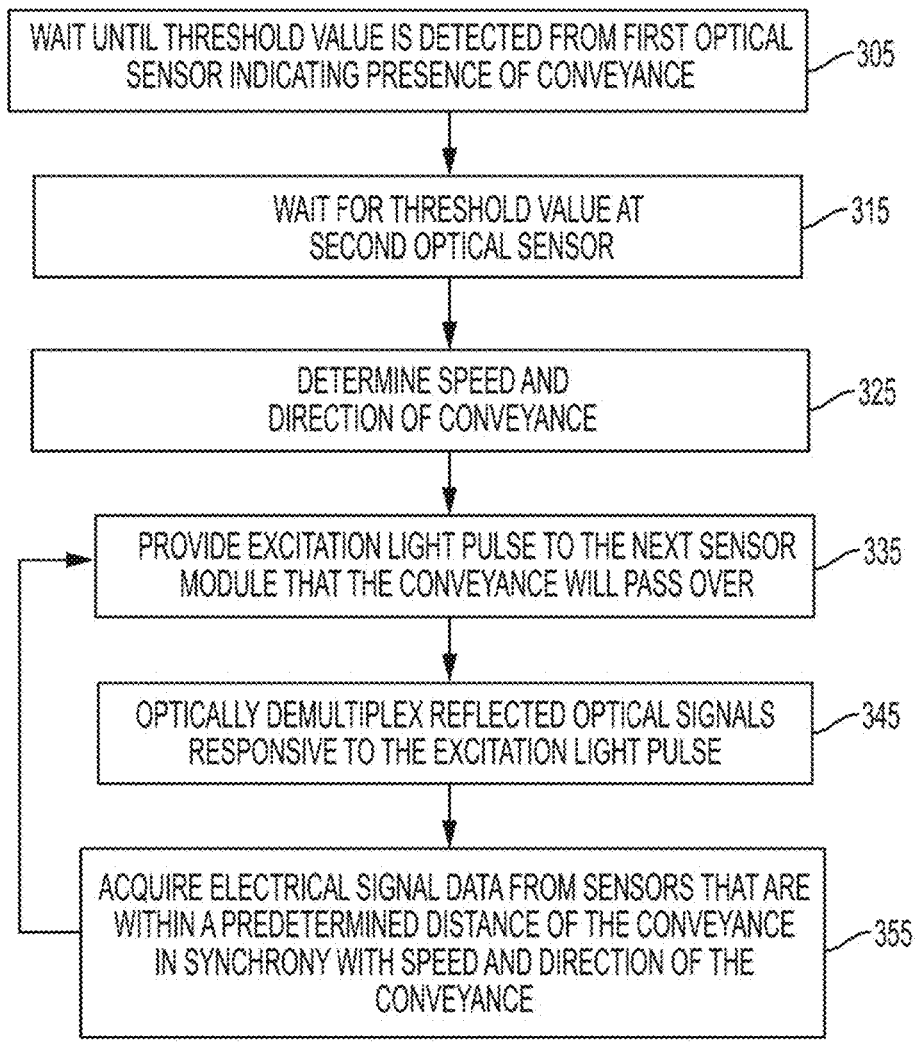
FIG. 3A is a flow diagram that describes synchronizing data collection from sensor modules with movement of a conveyance in accordance with some embodiments.

FIG. 3A is a flow diagram illustrating a method of collecting sensor data in accordance with embodiments that involve a multi-module sensor array as shown in FIG. 2B, for example. Detection 305, 315 by the DA controller of signals from two spatially separated sensors having magnitudes of at least a threshold value triggers data collection. After a second optical sensor registers 315 a signal magnitude at or above the threshold value, the data acquisition controller determines 325 the speed and direction of the conveyance. Based on the speed and direction of motion of the conveyance, the data acquisition controller determines the next sensor module that the conveyance will pass over. The data acquisition controller sends a signal to the excitation light source causing the light source to emit 335 an excitation light pulse to the sensor module that the data acquisition controller has selected. The optical signals reflected by the optical sensors of the module in response to the excitation light are optically demultiplexed 345. The electrical signal data from sensors of the selected module are acquired 355 in synchrony with the movement of the conveyance. The electrical signal of each sensor is acquired during the time period in which the conveyance is within a predetermined distance of the sensor.

Figure 3B:
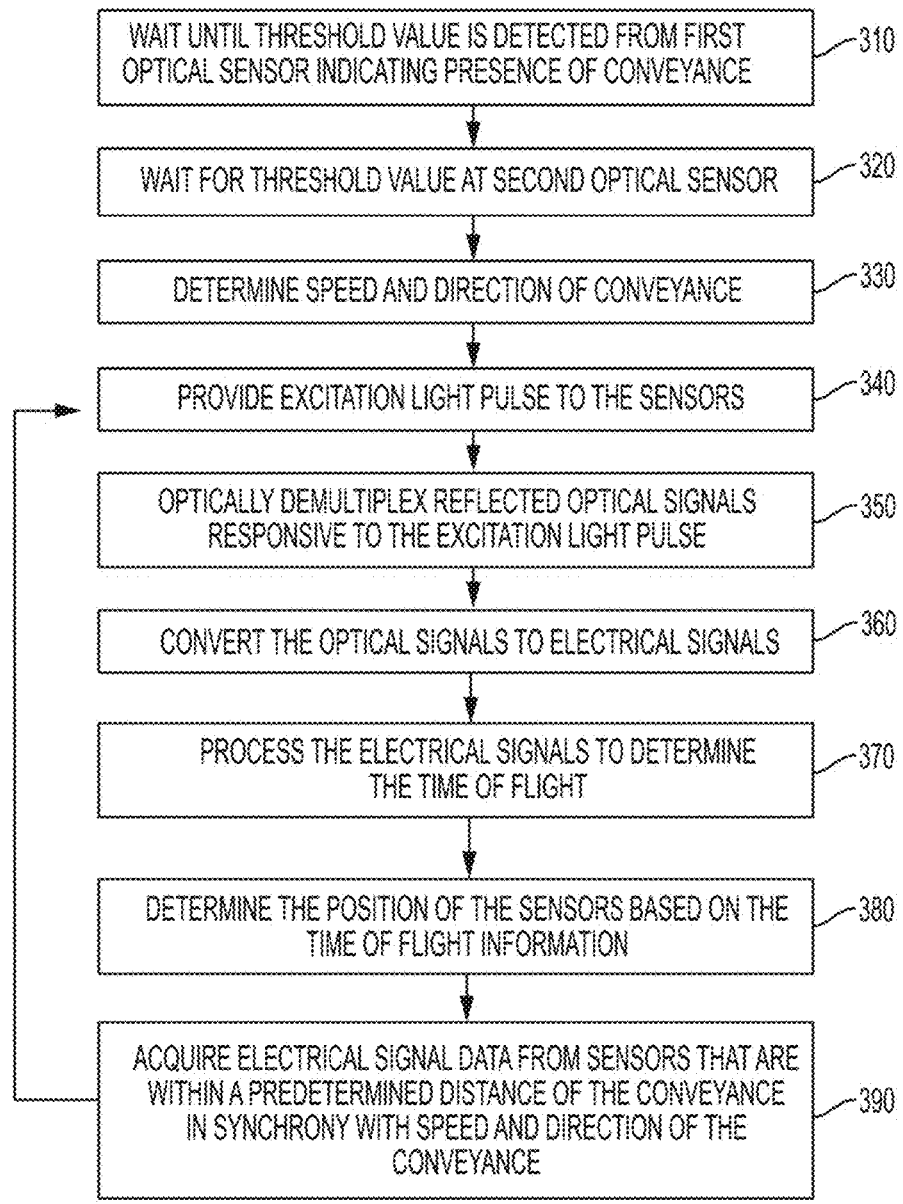
FIG. 3B is a flow diagram describing synchronizing data collection from sensors using time of flight information of the sensor signals in accordance with some embodiments.

FIG. 3B is a flow diagram illustrating a method of collecting sensor data in accordance with embodiments that use time of flight information to select the electrical signals that are collected as illustrated by the monitoring system of FIG. 2C. Detection 310, 320 by the data acquisition controller of signals from two spatially separated sensors having magnitudes of at least a threshold value triggers data collection. After a second optical sensor registers 320 a signal magnitude at or above the threshold value, the data acquisition controller determines 330 the speed and direction of the conveyance. A broadband excitation light pulse is provided 340 to the sensors in the array and the sensors reflect light in response to the excitation light pulse. The reflected light is optically demultiplexed 350 and the demultiplexed optical signals are converted 360 to electrical signals by the detector unit.

The data acquisition controller processes the electrical signals to determine 370 the time of flight of the optical signals from the sensors. The time of flight of the optical signals is used to determine 380 the location of the sensors, allowing the data acquisition controller to synchronize collection of the electrical signals from the sensors with the movement of the conveyance. The data acquisition controller collects data from sensors in a moving time window such that the sensors from which data is collected are within a predetermined distance of the moving conveyance.

Figure 3C:
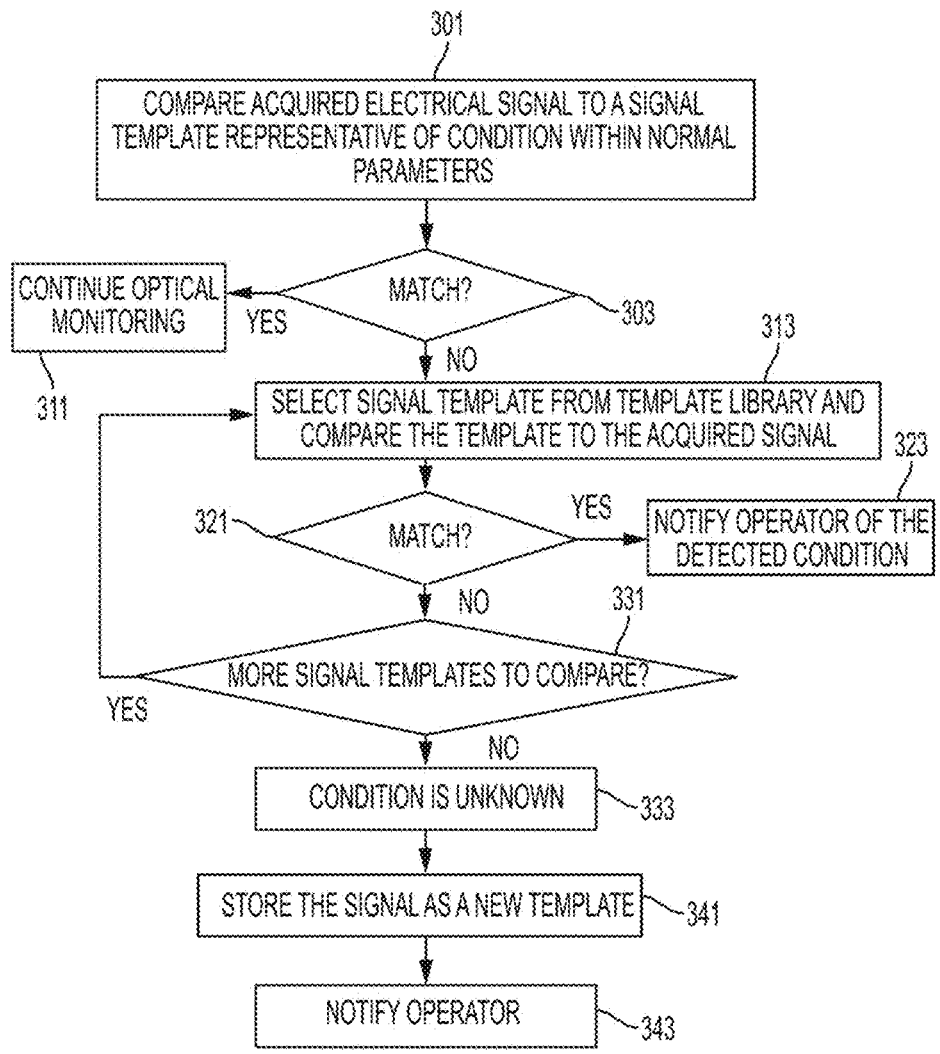
FIG. 3C is a flow diagram describing processes used to detect the state of the transportation system in accordance with some embodiments.

The flow diagram of FIG. 3C illustrates operation of the processor (see 170 in FIG. 1), to analyze the acquired electrical signals collected from the sensors to determine the state of the transportation system. Initially the processor may compare 301 the acquired electrical signal and/or features of acquired electrical signal to a signal/feature template comprising one or more representative signal segments and/or one or more signal features, e.g., frequency content, number or peaks, signal amplitude, etc. that characterize a condition that is within normal parameters, e.g., no degradation or failure, expected velocity, load, and load distribution. In some embodiments, the system may compare the acquired electrical signal to multiple normal signal/feature templates, each normal signal/feature template characterizing a different normal state of the transportation system. If the acquired electrical signal matches 303 any of the normal signal/feature templates, the monitoring system continues to monitor 311 the transportation system by acquiring additional electrical signals from the optical sensors.

However, it the acquired electrical signal does not match 303 the normal signal/feature template, the processor implements additional steps to determine the condition of the transportation system. The processor includes a library of stored signal/feature templates comprising one or more representative signal segments and/or one or more signal features, e.g., frequency content, number or peaks, signal amplitude, etc. At least some of the feature/signal templates may characterize an abnormal condition of the transportation system, e.g., fracture of transportation structure, one or more types of degradation of the transportation structure and/or the conveyance. At least some of the feature/signal templates may characterize other conditions of the transportation system, e.g., loading and/or loading distribution of the conveyance, etc. The signal/feature templates may be experimentally obtained, may be derived from some system model or representation, or may be acquired by the monitoring system as described herein.

The processor selects 321 a first signal/feature template from the template library and compares the selected template to the acquired electrical signal. If the selected signal template matches 321 the acquired electrical signal, the processor takes an action 323 that notifies the operator of the transportation system. If the selected template does not match 321 the acquired electrical signal, then the processor checks 331 to determine if there are more templates to compare. The processor continues to compare the templates of the library until 331 there are no more templates to compare. If the acquired electrical signal does not match any of the templates of the library, the processor may store 341 the acquired template as a new template that represents an unknown state of the transportation system. The processor may be programmed to notify 343 the operator that a new template has been acquired so that the operator can inspect the transportation system to identify the transportation system state. The operator may input a label that the processor associates with the new template. The label and the new template are stored in the template library and can subsequently be used to detect the state identified by the label assigned by the operator.

Figure 4:
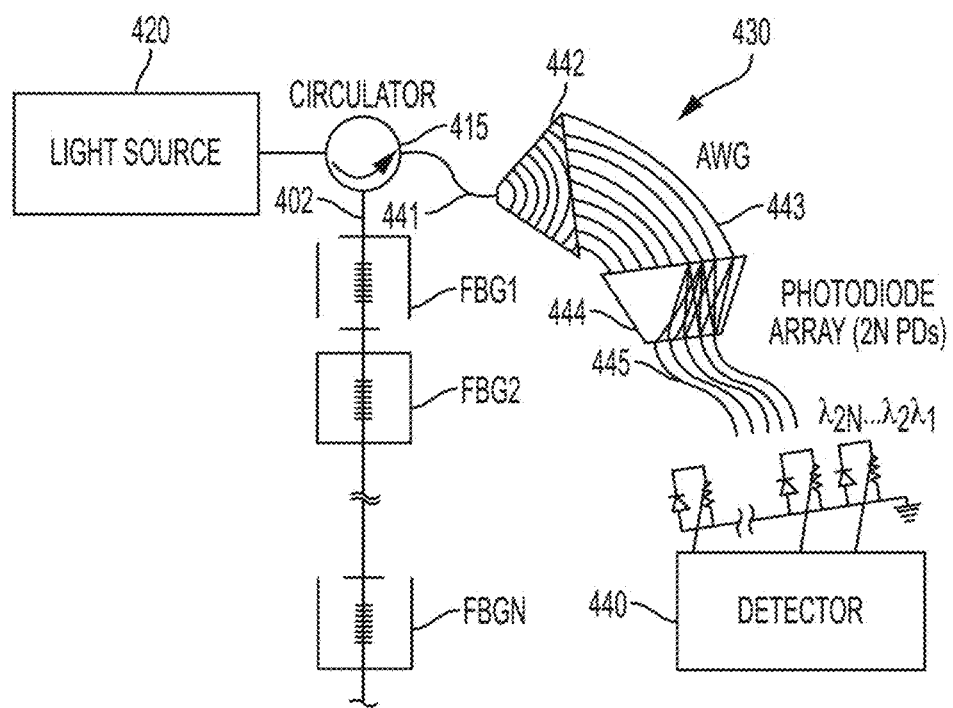
FIG. 4 illustrates wavelength domain multiplexing for multiple sensors using an arrayed waveguide grating (AWG) designed for sensing applications.

Embodiments disclosed herein can involve wavelength domain multiplexing and demultiplexing for multiple sensors as illustrated in FIG. 4. In the example of FIG. 4, multiple multiplexed optical signals are carried on waveguide 402. These multiplexed signals are optically demultiplexed by the optical demultiplexer 430, which in this example is an arrayed waveguide grating (AWG) designed for sensing applications. FIG. 4 shows operation of the optical components of a monitoring system for transportation in accordance with some embodiments. (Note that for simplicity, the data acquisition controller and processor are not shown). FIG. 4 illustrates a number of FBG sensors, FBG1, FBG2, . . . FBGN, which may be disposed along and spaced apart from one another along a transportation structure as previously discussed. FBG1 operates in a wavelength band having peak, center, or centroid wavelength $\lambda_1$, FBG2 operates in a wavelength band having peak, center, or centroid wavelength $\lambda_2$, and FBGN operates in a wavelength band having center wavelength $\lambda_N$. Vibrational emissions from the transportation structure and/or conveyance that are generated as the conveyance travels along the transportation structure cause shifts in the wavelength of the light reflected from the sensors FBG1, FBG2, . . . FBGN. The wavelength shifts responsive to the vibrational emissions are small compared to the spacing between the characteristic base wavelengths of the individual FBGs. Therefore, it is possible to separate the information from the different FBGs using dispersive elements such as arrayed waveguide gratings, linear variable filters and/or other dispersive elements in an optical wavelength domain demultiplexing scheme. As discussed herein and in more detail below, an optical time domain multiplexing scheme can optionally be implemented and can be used in conjunction with wavelength domain demultiplexing in some embodiments.

Light source 420 is configured to provide excitation light to the FBGs through optical circulator 415. The light source 420 has a bandwidth broad enough to provide excitation light for each of the FBG sensors over the range of expected reflected wavelengths of all the sensors. The AWG 430 may include N pairs of output waveguides 445, wherein each pair of output waveguides 445 is centered at wavelength around the reflection output of a particular FBG. Excitation light from the light source 420 travels through the circulator 415 and reflects off the FBGs as output light. The output light emanating from the FBGs is carried on sensor optical waveguide 402 through circulator 415 to the input waveguide 441 of the AWG 430. The AWG 430 is used as an optical wavelength domain demultiplexer in this embodiment When used as an optical demultiplexer, light from the AWG input waveguide 441 is dispersed via diffraction to output waveguides 445 depending on the wavelength of the light. For example, an AWG might have a center wavelength of 1550 nm, and 16 output channels with a channel spacing of 100 GHz (0.8 nm at that wavelength). In this scenario, light input at 1549.6 nm will go to channel 8, and light input at 1550.4 nm will go to channel 9, etc.

In some configurations, the AWG includes an input waveguide 441, a first slab waveguide 442, array waveguides 443, a second slab waveguide 444, and output waveguides 445. Each of the array waveguides 443 is incrementally longer than the next. The light from the input waveguide 441 is broken up in the first slab waveguide 442 among the array waveguides 443. At the output of each array waveguide 443, the light has accrued a wavelength-dependent phase shift, which also is incrementally more from one waveguide to the next. The outputs of the array waveguides 443 resemble an array of coherent sources. Therefore, the propagation direction of the light emitted from the array waveguides 443 into the second slab waveguide 444 depends on the incremental phase shift between the sources and hence the wavelength, as in a diffraction grating.

In some embodiments, the AWG (or other optical demultiplexer) and the detector unit 440 may be arranged as a planar lightwave circuit, i.e., integrated optical device. For example, these system components may be made from silicon-on-insulator (SOI) wafers using optical and/or electron beam lithography techniques. The planar lightwave circuit can be coupled to the fiber optic, aligned using V-grooves anisotropically etched into the silicon. Hybrid integration with other semiconductors, for example germanium, is possible to provide photodetection at energies below the bandgap of silicon.

In the AWG 430, the outputs of the array waveguides 443 (and hence the input side of the slab waveguide 444) may be arranged along an arc with a given radius of curvature such that the light emanating from them travels in the second slab waveguide 444 and comes to a focus a finite distance away. The inputs of the output waveguides 445 are nominally disposed at the focal points corresponding to specific wavelengths, although they may be set either in front of or behind the foci to deliberately introduce "crosstalk" between the output waveguides as will be described later. Therefore, light at the input 441 of the AWG 430 is passively routed to a given one of the output waveguides 445 depending on wavelength of the light. Thus, the output light from the sensors FBG1, FBG2, FBGN is routed to output waveguides 445 depending on the wavelength of the reflected output light.

The output waveguides 445 are optically coupled to detector unit 440 that includes photodetectors, e.g., 2N photodetectors. Due to the wavelength-based spatial dispersion in the AWG, the output light from the sensors FBG1, FBG2, . . . FBGN is spatially distributed across the surface of the detector unit 440. The photodetectors sense the light from the output waveguides and generate electrical signals that include information about vibrational emission of the transportation system.

Multiple optical signals carried, for example, on waveguide 401 are multiplexed signals. These multiplexed signals are optically demultiplexed by the optical demultiplexer 430.

Figure 5A:
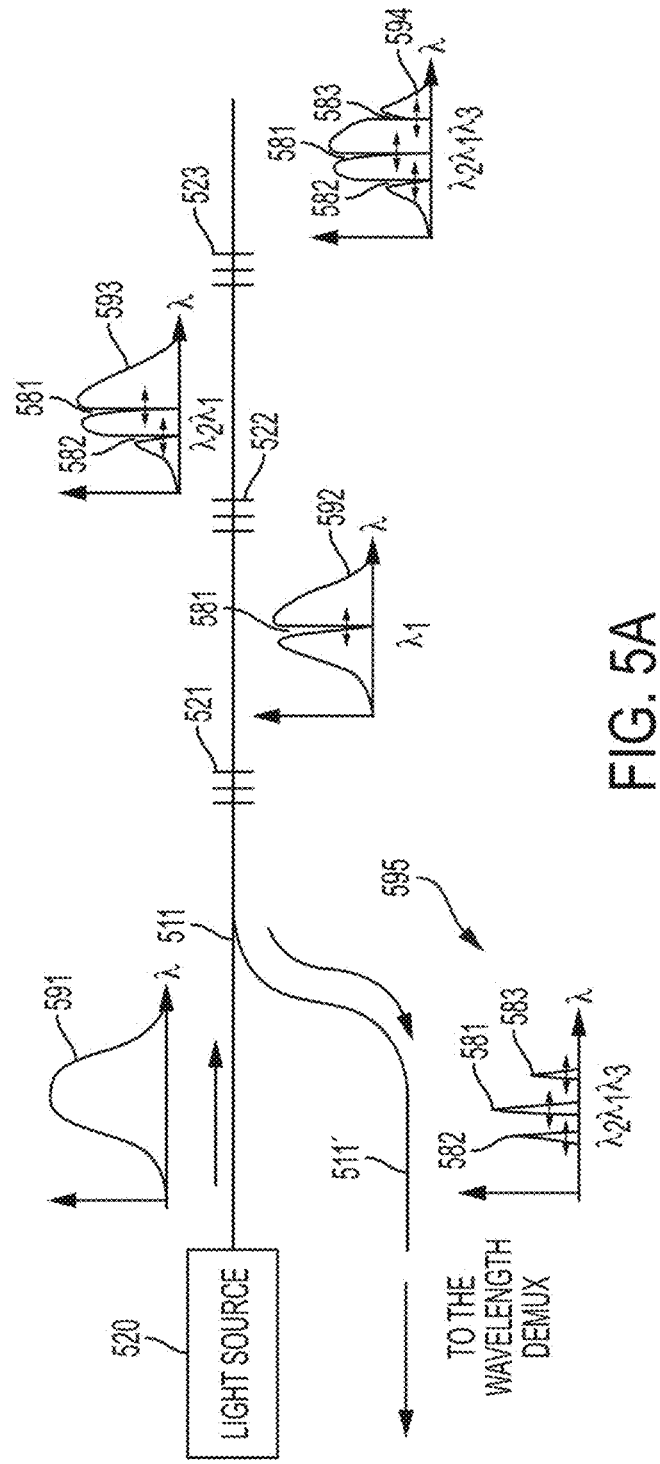
FIG. 5A illustrates reflected spectra for fiber Bragg grating (FBG) sensors.

FIG. 5A illustrates operation of a monitoring system with optically multiplexed sensor outputs. As indicated in FIG. 5A, broadband light is emitted by the light source 520, which may comprise or be a light emitting diode (LED) or superluminescent laser diode (SLD), for example. The spectral characteristic (intensity vs. wavelength) of the broadband light is shown by inset graph 591. The light is transmitted via the fiber optic cable 511 to the first FBG sensor 521. The first FBG sensor 521 reflects a portion of the light in a first wavelength band having a peak, center, or centroid wavelength, $\lambda_1$. Light having wavelengths other than within the first wavelength band is transmitted through the first FBG sensor 521 to the second FBG sensor 522. The spectral characteristic of the light transmitted to the second FBG sensor 522 is shown in inset graph 592 and exhibits a notch at the first wavelength band centered at $\lambda_1$ indicating that light in this wavelength band is reflected by the first sensor 521.

The second FBG sensor 522 reflects a portion of the light in a second wavelength band having a central or peak wavelength, $\lambda_2$. Light that is not reflected by the second FBG sensor 522 is transmitted through the second FBG sensor 522 to the third FBG sensor 523. The spectral characteristic of the light transmitted to the third FBG sensor 523 is shown in inset graph 593 and includes notches centered at $\lambda_1$ and $\lambda_2$.

The third FBG sensor 523 reflects a portion of the light in a third wavelength band having a central or peak wavelength, $\lambda_3$. Light that is not reflected by the third FBG sensor 523 is transmitted through the third FBG sensor 523. The spectral characteristic of the light transmitted through the third FBG sensor 523 is shown in inset graph 594 and includes notches centered at $\lambda_1$, $\lambda_2$, and $\lambda_3$.

Light in wavelength bands 581, 582, 583, having central wavelengths $\lambda_1$, $\lambda_2$ and $\lambda_3$ (illustrated in inset graph 595) is reflected by the first, second, or third FBG sensors 521, 522, 523, respectively, along the fiber optic cables 511 and 511' to an the optical wavelength demultiplexer. From the wavelength demultiplexer, the sensor light may be routed to a detection unit that converts the optical signals to electrical signals as previously discussed.

In some cases, the reflected light from the sensors may be time multiplexed. Time multiplexing may be used in lieu of, or in addition to wavelength multiplexing. In one scenario, instead of emitting broadband excitation light, the light source may be controlled by the data acquisition controller to scan through a wavelength range, emitting pulses of light in a number of narrow wavelength bands, each narrow wavelength band corresponding to the operating wavelength band of one of the sensors. The reflected light from the sensors is sensed during a number of sensing periods that are timed relative to the emission of the narrowband light pulses.

Figures 5B, 5C:
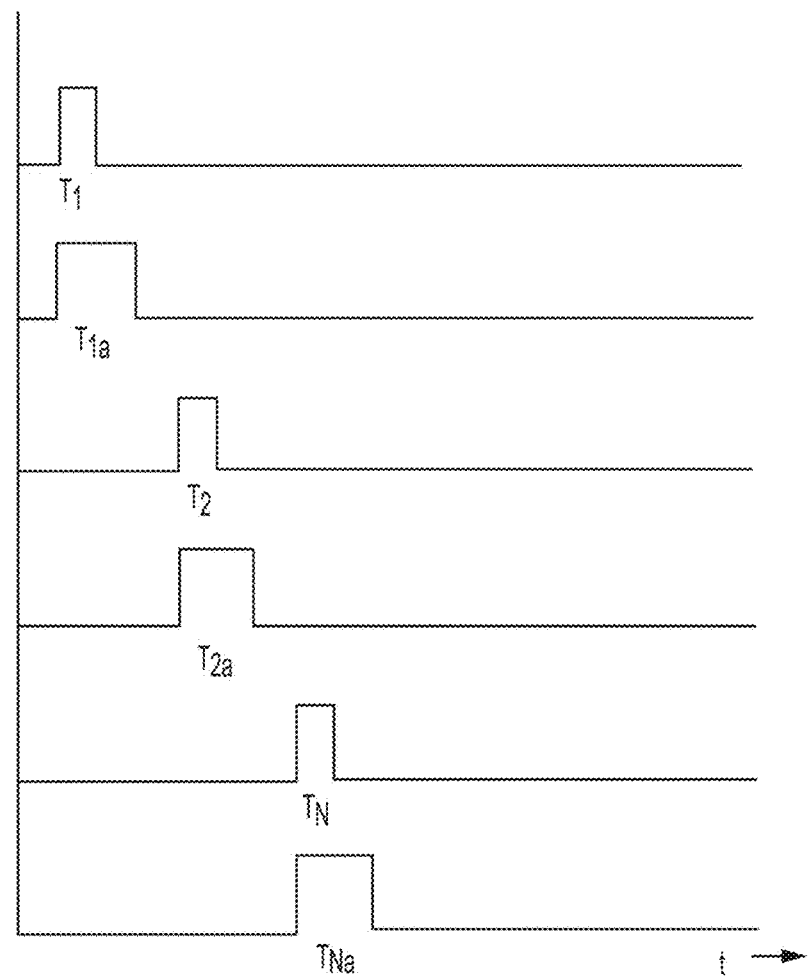
FIG. 5B shows sensors FBG1, FBG2, ... FBGN disposed on a fiber optic cable.
FIG. 5C is a timing diagram that shows the timing of excitation light pulses and the detection periods for the sensors of FIG. 5B in accordance with some embodiments.

For example, consider the sensors illustrated in FIG. 5B and the timing diagram of FIG. 5C. FIG. 5B shows sensors FBG1, FBG2, . . . FBGN disposed on a fiber optic cable. FBG1 operates in a wavelength band with central wavelength $\lambda_1$, FBG2 operates in a wavelength band with central wavelength $\lambda_2$, and FBGN operates in a wavelength band with central wavelength $\lambda_N$.

The timing diagram of FIG. 5C shows the timing of excitation light pulses and the detection periods for the sensors. The light source may be controlled by the data acquisition controller to emit an excitation light pulse having wavelength $\lambda_1$ during time period T1. The data acquisition controller controls the detector unit to detect the reflected light during time period T1a that overlaps time period T1. Following time period T1a, the light source emits an excitation light having wavelength $\lambda_2$ during time period T2 and senses reflected light during time period T2a that overlaps time period T2. Following time period T2a, the light source emits light having wavelength $\lambda_N$ during time period TN and senses reflected light during time period TNa that overlaps time period TN. Using this version of optical time domain multiplexing, each of the sensors FBG1, FBG2, . . . , FBGN may be interrogated during discrete time periods.

The fiber optic cable used for transportation system monitoring may comprise a single mode (SM) FO cable or may comprise a multi-mode (MM) FO cable. While single mode fiber optic cables offer signals that are easier to interpret, to achieve broader applicability and lower costs of fabrication, multi-mode fibers may be used.

MM fibers may be made of plastic rather than silica, which is typically used for SM fibers. MM fibers can work with less expensive light sources (e.g., LEDs) as opposed to SM fibers that may need more precise alignment with superluminescent diodes (SLDs). Therefore, sensing systems based on optical sensors in MM fibers may yield lower cost systems.

Figure 6:
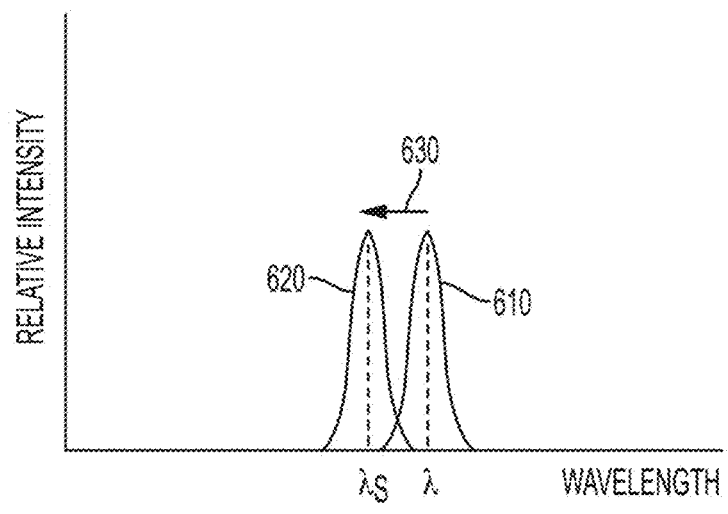
FIG. 6 shows an idealized shift in the wavelength spectrum for a FBG sensor deployed on a single mode fiber cable.

FIG. 6 is an idealized representation of light reflected from a FBG sensor deployed on a single mode fiber optic cable. In the characteristic base or known state, the FBG sensor reflects light in a relatively narrow wavelength band 610 having a centroid wavelength, $\lambda$. After the FBG sensor experiences a change in strain indicative of vibrational emissions from the transportation system, the light reflected by the sensor shifts to a different wavelength band 620 having a centroid wavelength $\lambda_s$. Wavelength band 620 may be similar in width, amplitude and/or other morphological characteristics when compared to wavelength band 610, but the centroid wavelength, $\lambda_s$, of wavelength band 620 is shifted 630 from the centroid wavelength, $\lambda$, of wavelength band 610 by an amount that is related to the change in the strain caused by the vibrational emissions. Wavelength bands of similar widths can be identified as wavelength bands having similar full width half maximum (FWHM) values, for example.

Figure 7:
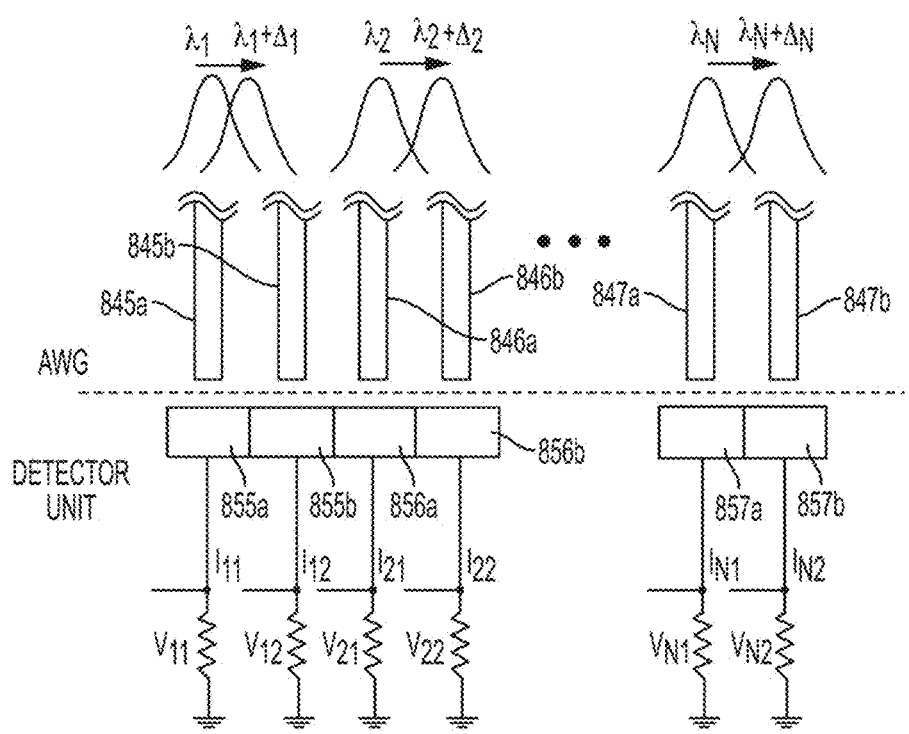
FIGS. 7, 8 and 9 illustrate in more detail the output waveguides of an AWG used as a wavelength domain optical demultiplexer and a detection unit according to some embodiments.
Figure 8:
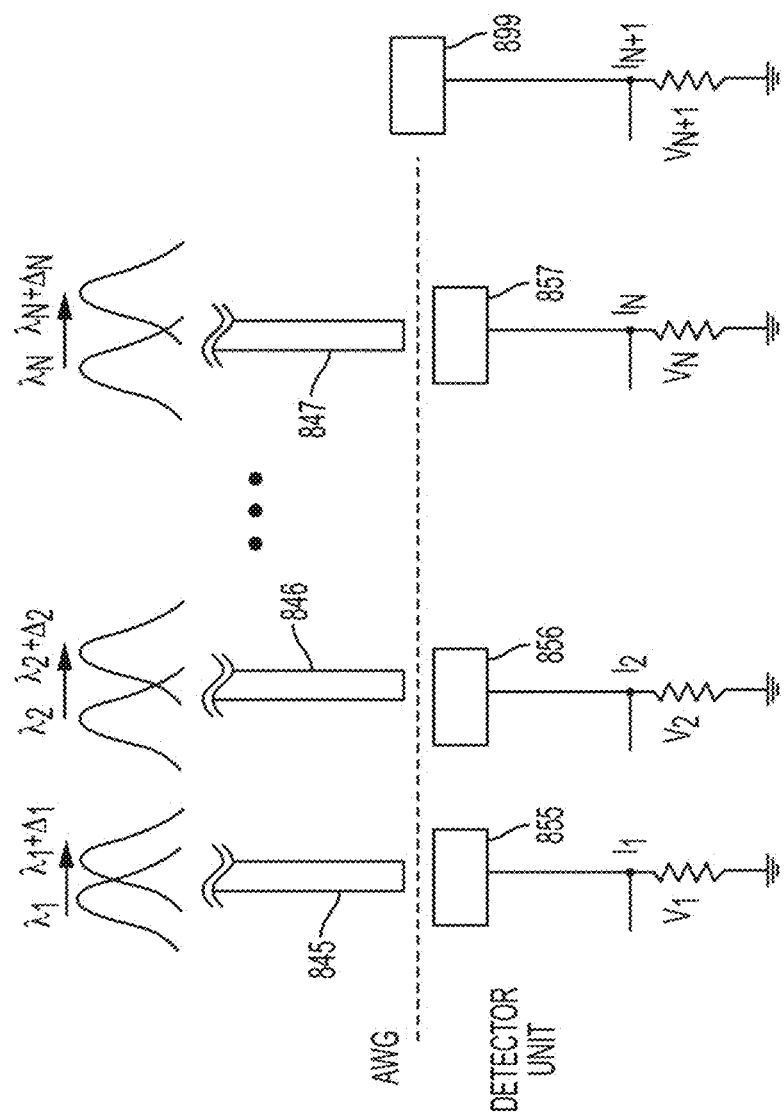
Figure 9:
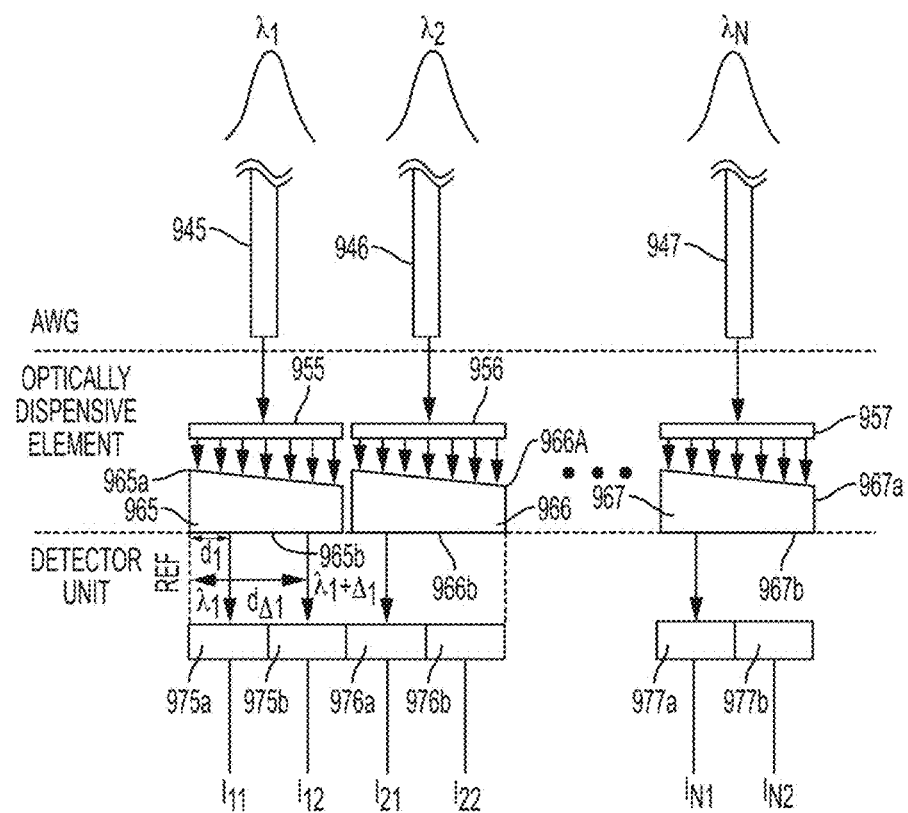

FIGS. 7, 8 and 9 illustrate various configurations of wavelength shift detector units that may be used to detect the vibrational emissions of the transportation structure and/or conveyance. These configurations provide for acquisition of high resolution signals that can be pattern matched to known signal/feature templates to determine the operational state of the transportation system. Use of the wavelength shift detector units as disclosed herein allows a signal to be acquired that represents a mechanical displacement having a resolution of between about 100 fm and 20 fm, or between about 70 fm and 30 fm, e.g., 50 fm or less, which allows for a wide range of normal and abnormal operational conditions to be discriminated.

FIG. 7 illustrates in more detail the output waveguides of an AWG used as a wavelength domain optical demultiplexer and a detector unit according to some embodiments. In this configuration, 2N photodetectors are respectively coupled to receive light from N sensors. The AWG spatially disperses sensor output light having centroid wavelengths $\lambda_1, \lambda_2, \ldots \lambda_N$ to the output waveguide pairs 845a,b, 846a,b, . . . 847a,b. Sensor output light having centroid wavelength $\lambda_1$ is dispersed to waveguide pairs 845a, 845b; sensor output light having centroid wavelength $\lambda_2$ is dispersed to waveguide pairs 846a, 846b; sensor output light having centroid wavelength $\lambda_N$ is dispersed to waveguide pairs 847a, 847b, etc. Light from output waveguide 845a is optically coupled to photodetector 855a which generates signal $I_{11}$ in response to the detected light; light from output waveguide 845b is optically coupled to photodetector 855b which generates signal $I_{12}$ in response to the detected light; light from output waveguide 846a is optically coupled to photodetector 856a which generates signal $I_{21}$ in response to the detected light; light from output waveguide 846b is optically coupled to photodetector 856b which generates signal $I_{22}$ in response to the detected light; light from output waveguide 847a is optically coupled to photodetector 857a which generates signal $I_{N1}$ in response to the detected light; light from output waveguide 847b is optically coupled to photodetector 857b which generates signal $I_{N2}$ in response to the detected light.

As the centroid of a sensor's output light shifts in response to strain, the AWG causes the spatial position of the sensor's output light to also shift. For example, if sensor output light that initially has a centroid at $\lambda_1$ shifts to a centroid at $\lambda_1 + \Delta_1$, as shown in FIG. 7, the amount of light carried by output waveguide 845a decreases and the amount of light carried by output waveguide 845b increases. Thus, the amount of light detected by photodetector 855a decreases and the amount of light detected by photodetector 855b increases with corresponding changes in the photocurrents $I_1$ and $I_2$. Thus, a change in the strain experienced by the sensor causes a shift in the sensor output light centroid from $\lambda_1$ to $\lambda_1 + \Delta_1$ which in turn causes a change in the ratio of $I_{11}$ to $I_{12}$.

The photocurrent of each photodiode may be converted into a voltage with a resistor or transimpedance amplifier, and sensed and digitized. The wavelength shift may be calculated for the $i^{th}$ FBG with the following formula:

$$\lambda_i \approx \lambda_{i0} + \frac{\Delta\lambda}{2} \frac{I_{2i} - I_{2i-1}}{I_{2i} + I_{2i-1}}$$

Here, $\lambda_i$ is the estimated wavelength of the $i^{th}$ FBG, $\lambda_{i0}$ is the center wavelength of an output waveguide pair, $\Delta\lambda$ is the wavelength spacing between the peak transmission wavelengths of an output waveguide pair, and photocurrent $I_{2i}$ and $I_{2i-1}$ represent the light intensities recorded by the photodetectors at the output of each waveguide in the pair. In some embodiments, the FBGs have a FWHM roughly equal to $\Delta\lambda/2$, such that as the reflected peak from the FBG shifts from one photodetector in the pair to the other, there is a continuous and monotonic change in the differential signal of the pair (numerator in the formula above). According to some embodiments, the voltage signals $V_{11}$, $V_{12}$, $V_{21}$, $V_{22}$, $V_{N1}$, $V_{N2}$ can be recorded and compared to known signal/feature templates to identify the state of the transportation system.

FIG. 8 illustrates in more detail another configuration of the output waveguides of an AWG used as a wavelength domain optical demultiplexer and detector unit according to some embodiments. In this configuration N photodetectors are respectively coupled to receive light from N sensors. The AWG spatially disperses sensor output light having centroid wavelengths $\lambda_1$, $\lambda_2$, ... $\lambda_N$ to the output waveguides 845, 846, ... 847. Sensor output light having centroid wavelength $\lambda_1$ is dispersed to waveguide 845; sensor output light having centroid wavelength $\lambda_2$ is dispersed to waveguide 846; sensor output light having centroid wavelength $\lambda_N$ is dispersed to waveguide 847, etc. Light from output waveguide 845 is optically coupled to photodetector 855 which generates signal $I_1$ in response to the detected light; light from output waveguide 846 is optically coupled to photodetector 856 which generates signal $I_2$ in response to the detected light; light from output waveguide 847 is optically coupled to photodetector 857 which generates signal $I_N$ in response to the detected light.

As the centroid of a sensor's output light shifts in response to the sensed parameter, the AWG causes the spatial position of the sensor's output light to also shift. For example, if sensor output light that initially has a centroid at $\lambda_1$ shifts to a centroid at $\lambda_1+\Delta_1$ as shown in FIG. 8, the amount of light carried by output waveguide 645 increases. Thus, the amount of light detected by photodetector 855 increases with a corresponding change in the photocurrent $I_1$. Thus, vibrational emission from the transportation structure causes a shift in the sensor output light centroid from $\lambda_1$ to $\lambda_1+\Delta_1$, which in turn causes a change in the current $I_1$. According to some embodiments, the photocurrents $I_1$, $I_2$, $I_N$ can be converted to a voltage signals $V_1$, $V_2$, $V_N$. The voltage signals, $V_1$, $V_2$, $V_N$ can be recorded and compared to known signal/feature templates to identify the state of the transportation system.

Changes in the photodetector current that are caused by fluctuations of excitation light source intensity can be differentiated from changes in photodetector current caused by wavelength shifts in sensor output light by measuring the light source intensity with an additional photodetector 899 that generates current $I_{N+1}$. Then, a wavelength shift can be calculated from the ratio $I_1/I_{N+1}$ for sensor 1, $I_2/I_{N+1}$ for sensor 2, etc.

FIG. 9 illustrates in more detail the output waveguides of an AWG used as a wavelength domain optical demultiplexer, an additional dispersive element, and a detector unit according to some embodiments. In this example, the output light from sensors 1, 2 ... N having initial centroid wavelengths $\lambda_1$, $\lambda_2$, ... $\lambda_N$ is respectively spatially dispersed to output waveguides 945, 946, ... 947 of the AWG. The light from output waveguides 945, 946, ... 947 is incident on a linearly variable transmission structure (LVTS) 965, 966, ... 967 or other spatially dispersive optical element.

Optionally, the LVTS includes spreading components 955, 956 ... 957 configured to collimate and/or spread the light from the output waveguide 945, 946 ... 947 across an input surface of LVTS 965, 966, ... 967. In arrangements where sufficient spreading of the light occurs from the output waveguides 945, 946, ... 947, the spreading components may not be used. The LVTS 965, 966, ... 967 comprises a dispersive element, such as a prism or a linear variable filter. The LVTS 965, 966, ... 967 receives light at its input surface 965a, 966a, ... 967a from the waveguide 945, 946, ... 947 and (optionally) the spreading component 955, 956, ... 957 and transmits light from its output surface 965b, 966b, ... 967b to photodetector pairs 975, 976, ... 997. At the output surface 965b, 966b, ... 967b of the LVTS 965, 966, ... 967, the wavelength of the light varies with distance along the output surface. Thus, the LVTS 965, 966, ... 967 can serve to further demultiplex the optical signal incident at the input surface 965a, 966a, ... 967a of the LVTS 965, 966, ... 967 according to the wavelength of the light.

FIG. 9 shows two wavelength bands emitted from the LVTS 965, an initial emission band has a centroid wavelength of $\lambda_1$ emitted at distance $d_1$ from a reference position (REF) along the output surface 965b. In response to the sensed parameter, the initial wavelength band shifts to a wavelength band having centroid wavelength $\lambda_1+\Delta_1$. The shifted wavelength band is emitted at distance $d_{\Delta 1}$ from the reference position.

A photodetector pair 975 is positioned relative to the LVTS 965 so that light transmitted through the LVTS 965 falls on the photodetector pair 975. For example, light having wavelength $\lambda_1$ may fall predominantly on photodetector 975a and light having wavelength $\lambda_1+\Delta_1$ may fall predominantly on photodetector 975b. The photodetector 975a generates signal $I_{11}$ in response to light falling on its light sensitive surface and photodetector 975b generates signal $I_{12}$ in response to light falling on its light sensitive surface. Photocurrents $I_{11}$, $I_{12}$ can be converted to voltage signals as previously discussed. The voltage signals can be recorded and compared to known signal/feature templates to determine the state of the transportation system.

Traditionally, AWGs have been used in high speed communication systems and are designed to minimize crosstalk between adjacent channels. This is important for digital communications because the bit error rate must be made very low (on the order of $10^{-12}$) so it is suboptimal for light from one channel to leak into the next. Embodiments described herein involve AWGs specifically designed for sensing applications. These AWGs deliberately introduce crosstalk between adjacent channels.

Figure 10A:
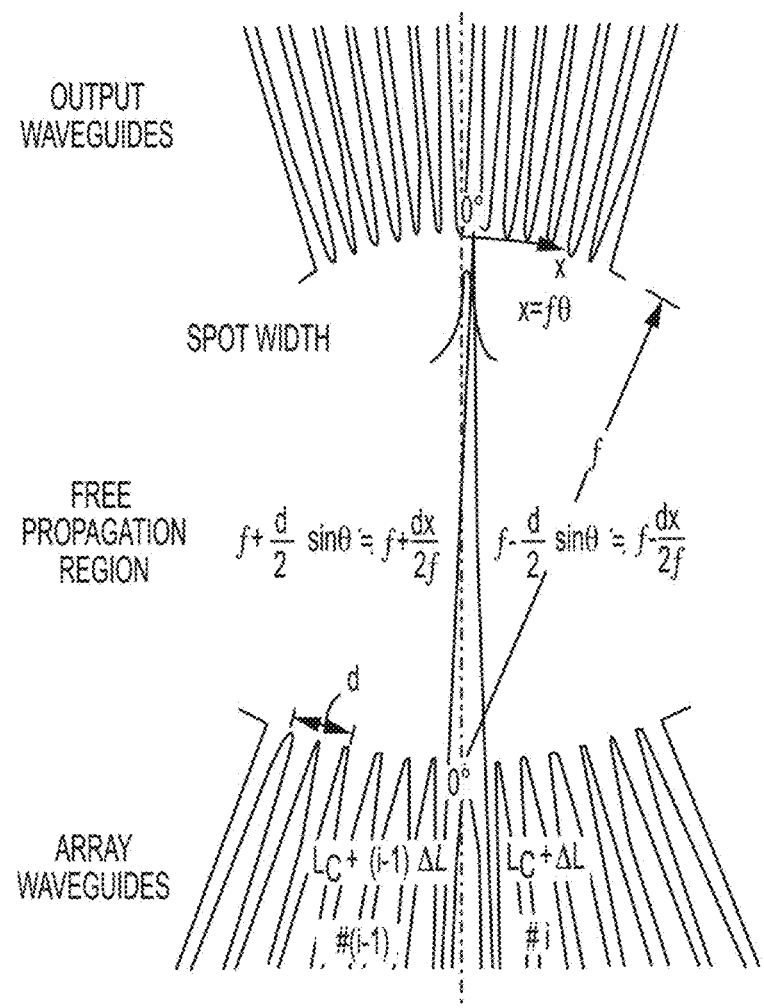
FIGS. 10A and 10B show portions of AWGs and illustrate techniques for deliberately introducing crosstalk into the output waveguide signals in accordance with some embodiments.

In some embodiments, AWGs with crosstalk are configured so that the center-to-center spacing between adjacent output waveguides in a pair of output waveguides is less than the optical spot size at the output waveguides, where the optical spot size is the full width half maximum (FWHM) of the intensity of the spot. In FIG. 10A, the output coupler of an AWG is shown with the spacing of the output waveguides decreased from "normal" telecom operation to introduce crosstalk between adjacent channels. Here, there is an incremental length between adjacent array waveguides of $\Delta L$. This increment is nominally chosen as a multiple m of the center wavelength of the AWG (where m represents the diffraction order of the AWG), so that light exits from the center output waveguide at the center wavelength of the AWG. The spacing of the array waveguides is d, and the change in position of the optical spot at the input of the output waveguides for a change in wavelength $\Delta\lambda$ is given as:

$$\Delta x \approx m f \Delta \lambda / d,$$

where f is the distance from the array waveguides to the output waveguides (note the radius of curvature of both the input and output side of the slab waveguide is also f, so that the optical spot comes to a focus at the output waveguides).

The spacing of a pair of output waveguides should represent a translation of the spot from mostly on one waveguide to mostly on the other waveguide as the FBG's reflected wavelength translates over its range. That is, for a change in reflected center wavelength Δλ, the spacing of the pair should be chosen according to the formula above. However, the center wavelength of different pairs of output waveguides should be tailored so as to not cause interference between the different pairs (for example, if 8 channels are equally spaced in an AWG, using channels 1 and 2 for the first sensor, 4 and 5 for the second sensor, and 7 and 8 for the third sensor would provide adequate isolation between the sensor readouts in some circumstances).

In some embodiments, the optical spot size at a pair of output waveguides is on the order of the lateral translation of the spot expected over the range of operation of the sensor, which should in turn be on the order of the pair spacing. If the spot is too broad compared to the spacing, the differential signal between the two output waveguides within the pair will be small, and if it is too narrow, the dynamic range of the sensor will be limited. The spot size can be estimated from diffraction considerations to be roughly $2f\lambda/Kd$, where K is the number of array waveguides and λ is the operating wavelength.

There are a number of methods that may be used to adjust the spot size relative to the channel spacing, e.g., by decreasing the output waveguide spacing, by increasing the spot size at the input of the output waveguides; and/or by moving the output waveguides away from the focal point of the array waveguides.

Figure 10B:
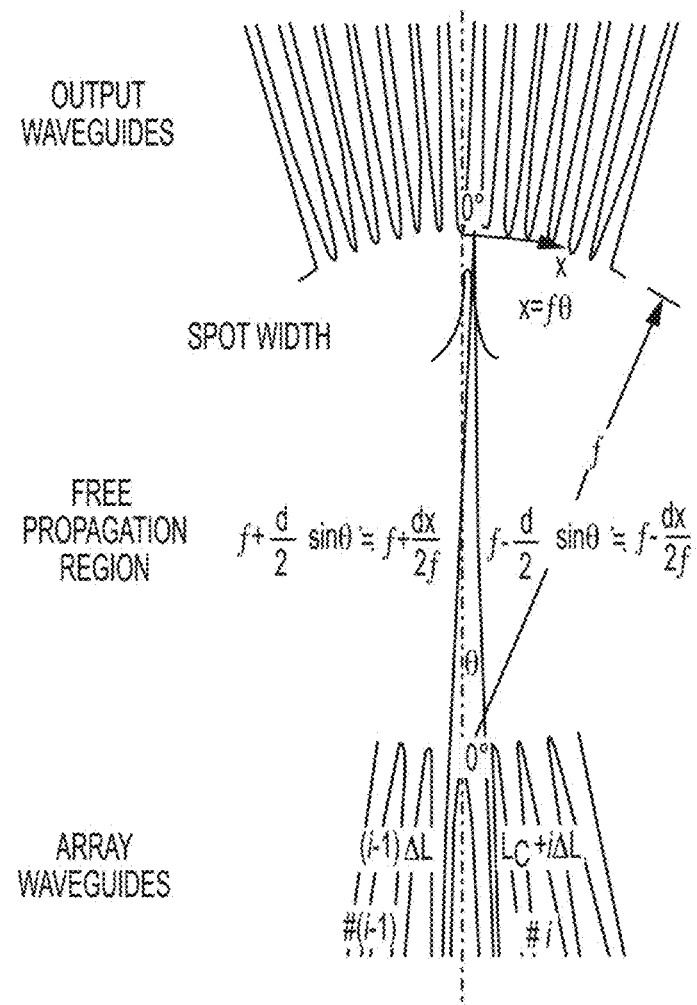

In FIG. 10A, the channel spacing/spot size ratio is adjusted by keeping the spot size fixed (assuming it is already the proper size for operation, e.g., to provide optimal operation), but decreasing the output waveguide spacing. In FIG. 10B, the channel spacing is assumed to be sufficient, e.g., optimal, according to the above considerations, but the spot size is increased to be within its optimal range by decreasing the number of array waveguides K. We can find a good value of K by combining the equations above if we set $$\Delta x \approx \frac{mf\Delta\lambda}{d} = \frac{2f\lambda}{Kd},$$

so $K \approx 2\lambda/m\Delta\lambda$. In addition, adjusting the spot size relative to the channel spacing may be implemented by moving the output waveguides away from the focal length $f_0$ of the array waveguides to a new distance f, such that the spot size becomes roughly $Kd|f-f_0|/f_0$.

Figure 11:
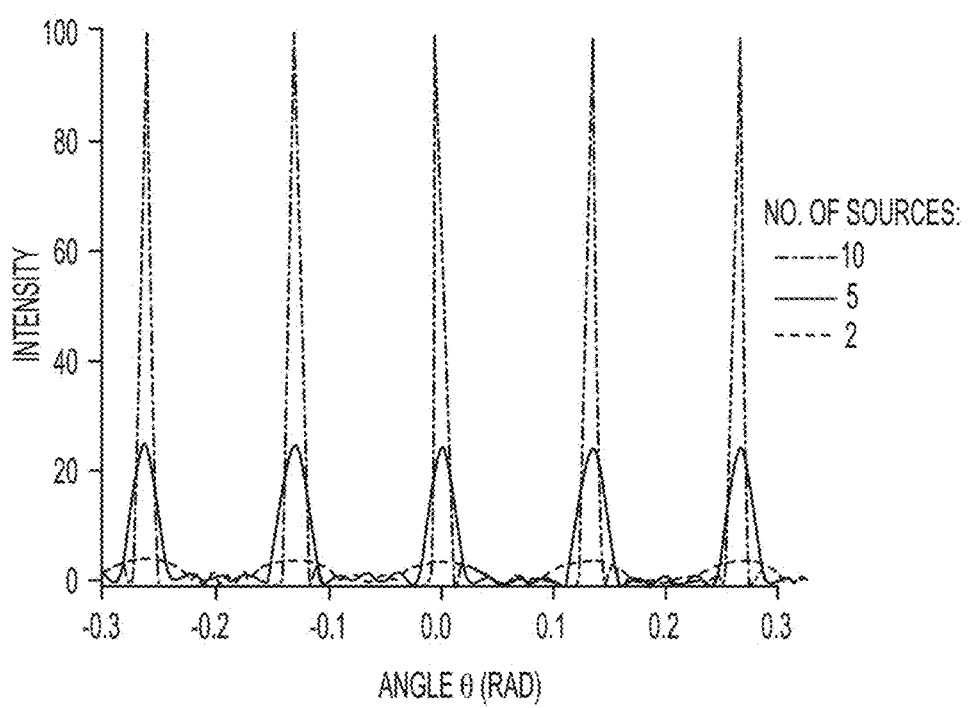
FIG. 11 is a graph showing that a decreasing the number of sources broadens the angular distribution of the light emanating from an array of coherent sources.

As shown in FIG. 11, decreasing the number of sources broadens the angular distribution of the light emanating from an array of coherent sources. This phenomenon can be understood in analogy to a smaller lens having poorer diffraction-limited performance compared to a bigger lens. Therefore, even a relatively narrow spectral peak can be distributed across two channels so that an intensity-independent wavelength shift can be detected.

It is often the case that many more FBGs need to be sensed than there are available photodiodes/output channels of the AWG. Therefore, in some embodiments, optical time domain multiplexing is used in conjunction with optical wavelength division multiplexing and demultiplexing. For each input of a multi-input AWG, there is a known wavelength-dependent mapping to the output waveguides. Therefore, time division multiplexing and wavelength division demultiplexing can be combined to address a far greater number of sensors than could be addressed with either method alone. The use of time domain multiplexing also facilitates recording the electrical signals of the sensors in a moving window that is synchronized in the movement of the conveyance. In some embodiments, the optical switches could be integrated onto the same substrate as the AWG allowing fabrication of modules having an identical structure.

Figure 12:
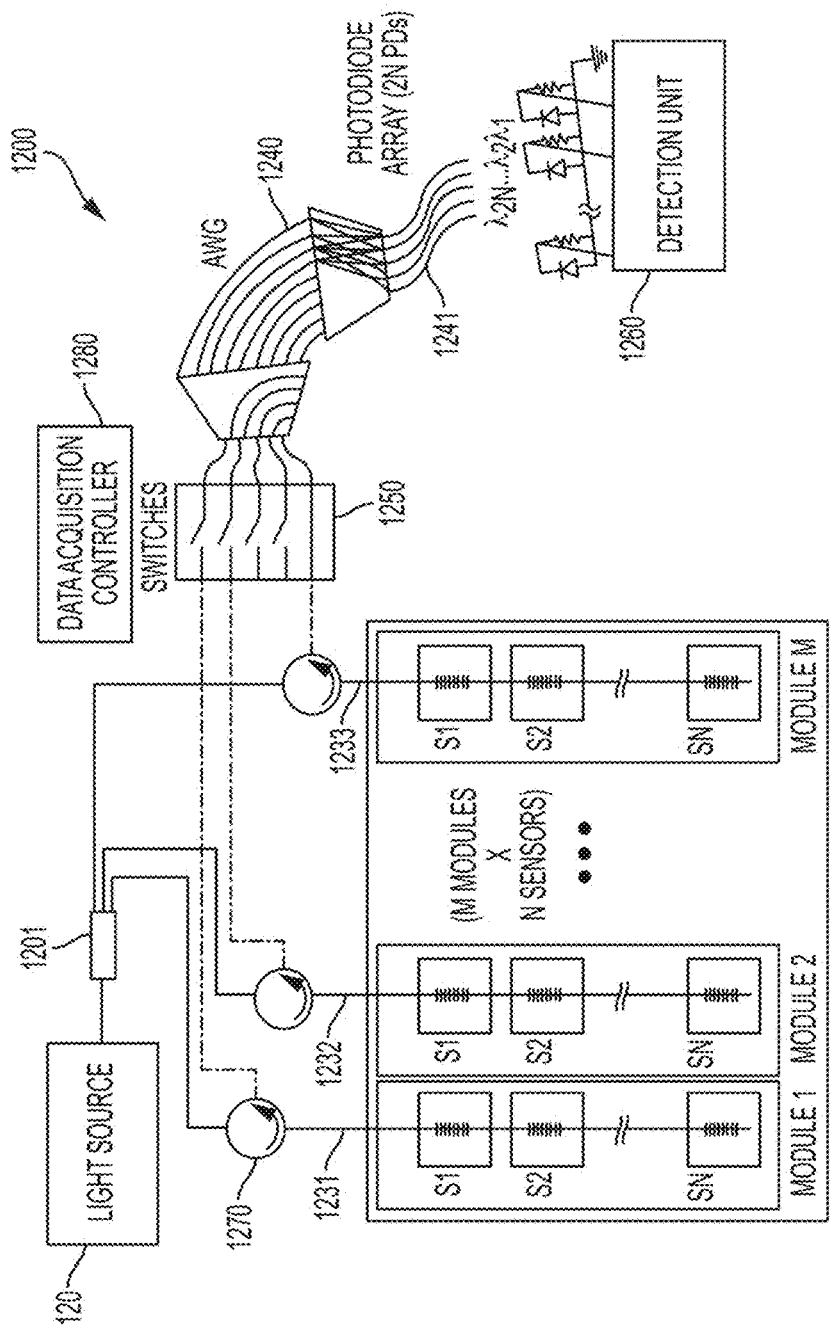
FIG. 12 shows a block diagram of a monitoring system that implements a bank of M optical switches for time division multiplexing and an AWG for wavelength division multiplexing in accordance with some embodiments.

FIG. 12 shows a configuration of a system 1200 that uses both time domain multiplexing and wavelength domain multiplexing to address multiple modules having multiple FBG sensors. In this particular example, the system 1200 monitors a transportation system using M sensor modules, each module having N FBG sensors S1, S2, ... SN disposed on a single optical fiber. The N FBGs are distributed in wavelength according to the output channels of an AWG 1240 used as an optical wavelength domain demultiplexer. The modules and the optical fibers/FBGs may be all identically constructed. Light is passed from the light source 120 to the sensor modules by way of a 1×M optical power splitter 1201 and M circulators 1270. Sensor output light from Modules 1, 2, ... M is passed through a time domain optical multiplexer 1250 to M inputs of an M-input by 2N-output AWG 1240. The time domain multiplexer 1250 comprises a bank of M optical switches controlled by data acquisition controller 1280. The output waveguides 1231, 1232, ... 1233 of the modules 1 to M are selected one at a time and are optically coupled to the respective input waveguide of the AWG 1240. The AWG 1240 spatially disperses the light from the sensor modules to the AWG output waveguides 1241 and then the output light is routed to detection unit 1260 as previously discussed.

Figure 13:
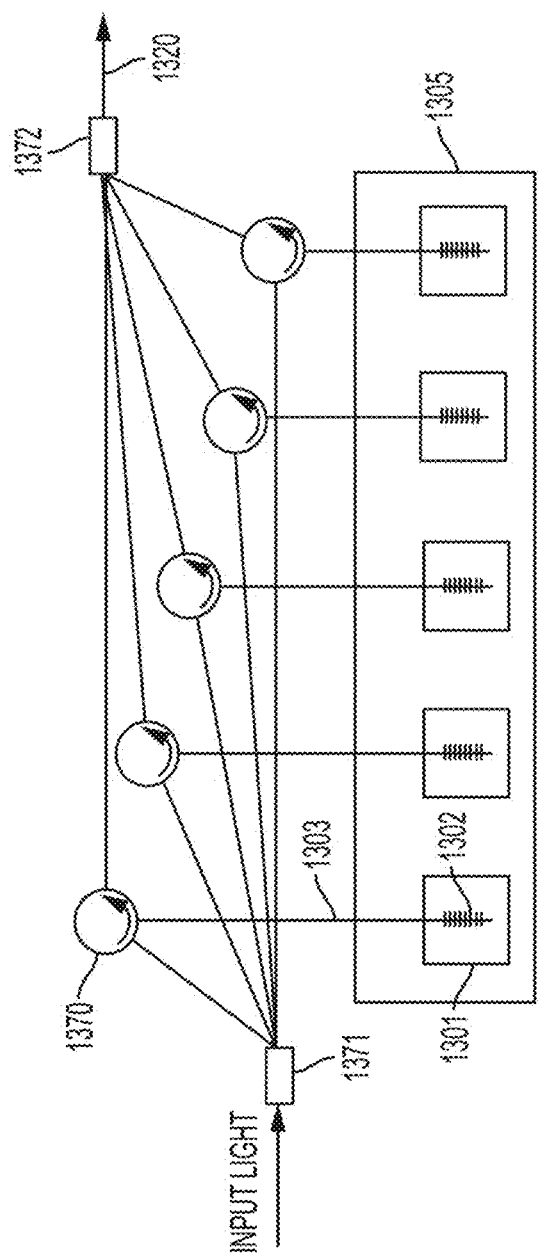
FIG. 13 illustrates a configuration for multiplexing sensor output light at the module level.

FIG. 12 depicts sensors S1, S2, ... SN arranged so that the output light of each sensor is multiplexed onto the single output waveguide 1231, 1232, ... 1233 for the module. FIG. 13 shows an alternative configuration for multiplexing sensor output light having different wavelength bands at the module level. One or more FBGs 1302 are disposed on a sensor optical waveguide 1303. Input light is optically coupled through a 1×N power splitter 1371 to circulators 1370. The circulators 1370 connect the sensor output waveguides 1303 in parallel to through an N×1 power splitter 1372 to the output waveguide 1320 for the module 1305. The output waveguide carries the combined (wavelength multiplexed) output light from all FBGs 1302 in the sensor module 1305. The module arrangement shown in FIG. 13 can be used to replace each of the modules shown in FIG. 12, for example.

Figure 14:
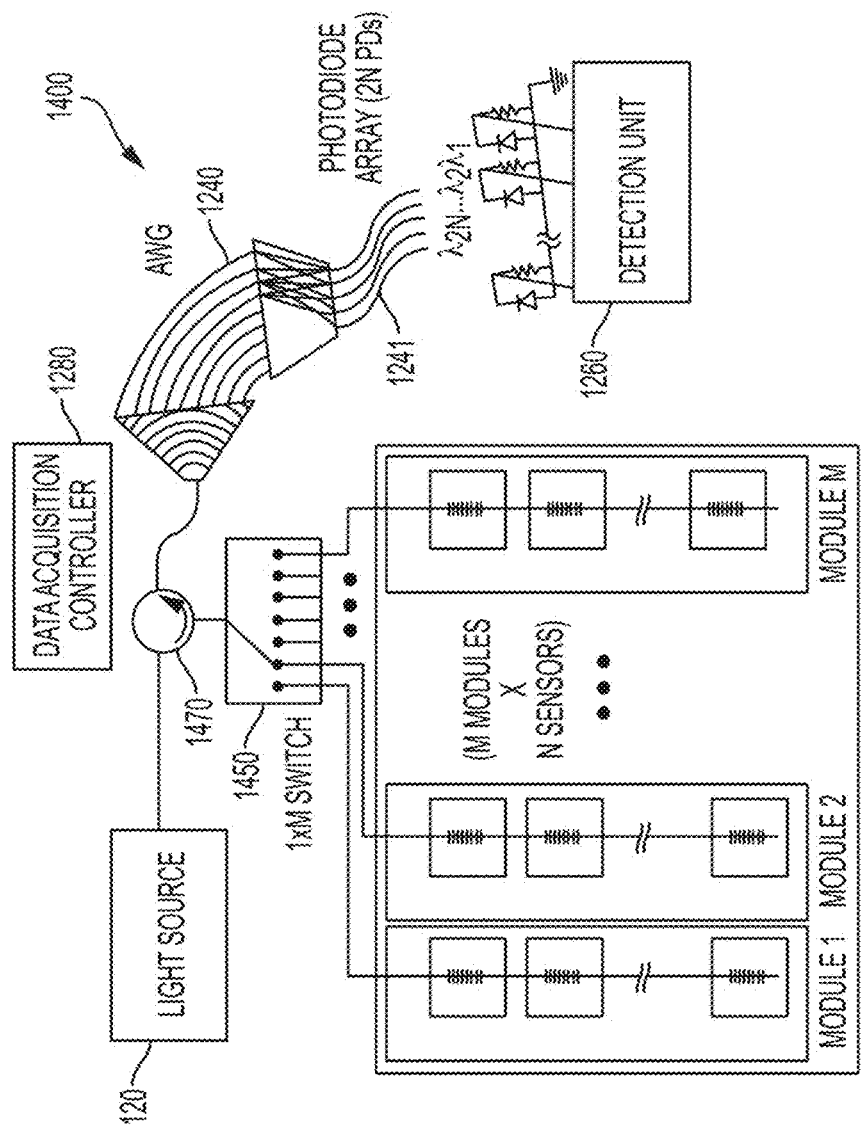
FIG. 14 depicts a monitoring system that uses time division multiplexing and wavelength division multiplexing in accordance with some embodiments.

FIG. 14 depicts another monitoring system 1400 that uses time domain multiplexing and wavelength domain multiplexing in accordance with some implementations. The monitoring system 1400 of FIG. 14 is similar in some respects to the monitoring system of 1200 of FIG. 12 and like reference numbers are used to refer to similar elements. System 1400 replaces the M optical switches 1250 and M optical circulators 1270 with a 1×M optical switch 1450 and an optical circulator 1470 disposed between the switch 1450 and light source 120.

Figure 15:
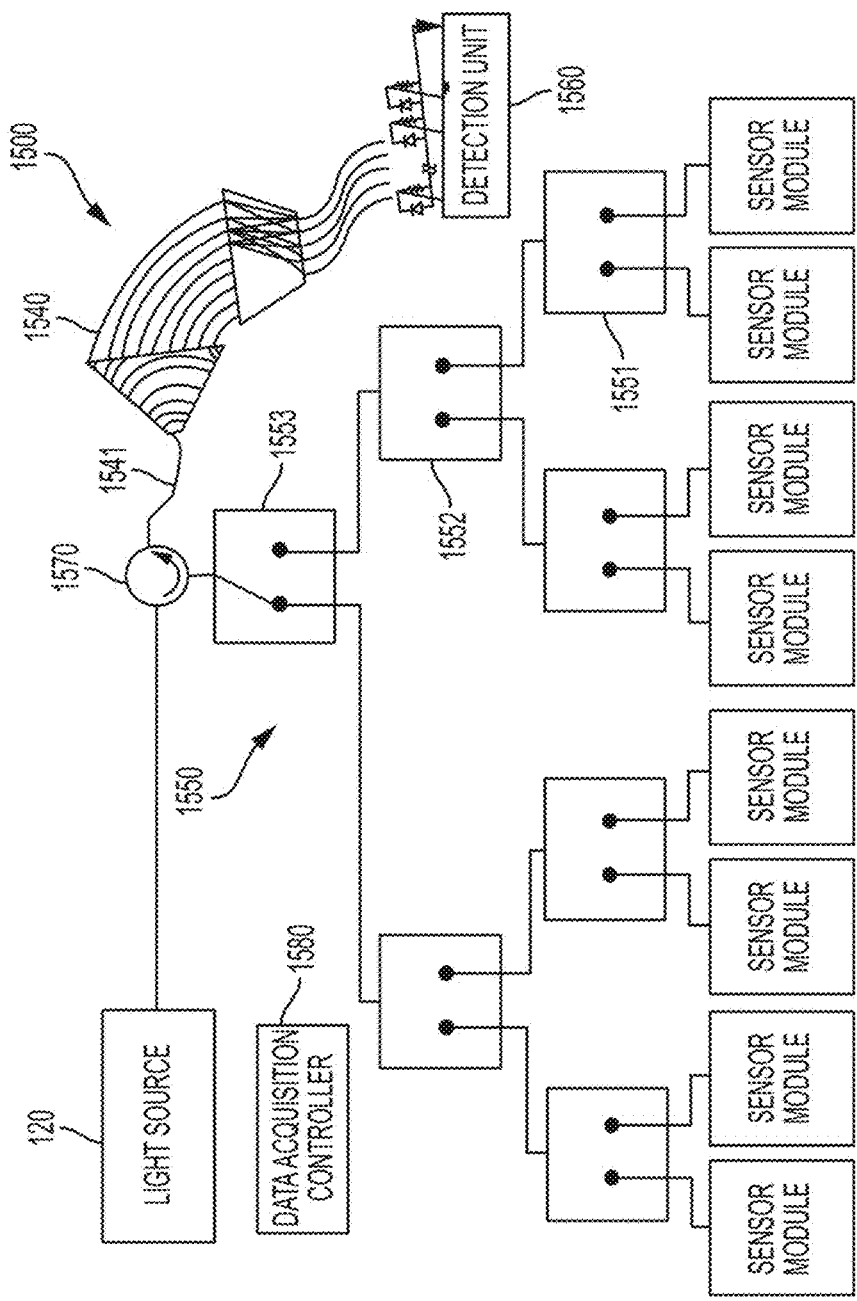
FIG. 15 is a block diagram illustrating a hierarchical switch arrangement that may be used for time division multiplexing.

FIG. 15 illustrates a monitoring system 1500 that includes a hierarchical switching arrangement to implement optical time domain multiplexing. The switching arrangement 1550 in the illustrated monitoring system 1500 includes a first level of four 1×2 optical switches 1551 (the bottom-most level of switches in FIG. 15A) coupled to 8 sensor modules, a second level of two 1×2 optical switches 1552 (the next to bottom-most level of switches in FIG. 15A) optically coupled between the first level switches 1551 and a single 1×2 third level optical switch 1553. The switching arrangement 1550 is connected to the light source 120 and the wavelength division demultiplexer (AWG) 1540 through an optical circulator 1570. The switches 1551, 1552, 1553 are controlled by data acquisition controller 1580 such that the output light from each sensor module is time multiplexed into the input waveguide 1541 of the AWG. The AWG 1540 demultiplexes the time multiplexed sensor output light, spatially dispersing the output light according to wavelength to the output waveguides and to the detection unit 1560.

A variety of types of optical switches can be used for the time division multiplexers discussed herein. Suitable optical switch technologies include micro-electro-mechanical systems (MEMS) optical switches, liquid crystal switches, bubble switches, thermo-optic switches, phased-array switches, and electro-holographic switches, for example.

As previously discussed, recordation of the electrical signals generated by the detector units discussed in the examples above is controlled by a data acquisition controller. The data acquisition controller is configured to synchronize the acquisition of the electrical signals with movement of the conveyance.

The monitoring systems proposed herein may include one or more components that are integrated onto the same substrate. For example, it is possible to implement the monitoring system using discrete components, e.g., by fiber-coupling the outputs of the AWG and then sending the AWG output to individual fiber-coupled photodetectors.

Alternatively, the photodetectors, e.g., photodiodes, could be integrated directly into the output waveguides of the AWG. Integrating one or more of the monitoring system components onto the same substrate can yield substantial cost, size, and complexity savings. Note that it may be possible to integrate all components onto the same substrate, including the light source, circulator, optical switches, AWG, photodiodes, and digitizer, using electronic/photonic circuit hybrid integration methods.

The approaches discussed herein can provide a high degree of sensor multiplexing with a single detector portion as well as the potential for high levels of integration. Some or all components of the detector portion of the monitoring system—light source, circulator(s), time division multiplexer, wavelength division demultiplexer, and digitizer—could be integrated onto the same substrate, with the only external connections being electrical connections to a power source, electrical and/or optical communications with the monitoring and/or management processor, and optical fiber connections to the sensors. Such an integrated device could potentially yield significant cost/size/performance enhancements when manufactured in high volumes as compared to non-integrated approaches.

Example

Experiments were conducted using a 1:22 G-scale train system setup. A circular loop of steel track was assembled on a layer of ballast. A scaled-down electric locomotive pulling a carrier wagon that can be loaded with weights was operated over the track.

Figure 16C:
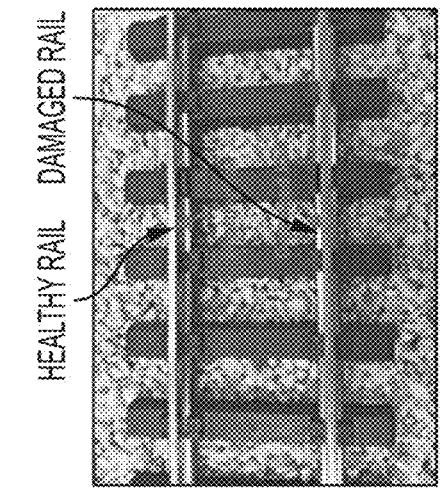
FIG. 16C is a photograph showing wear damage in the lower track introduced using a file for controlled damage detection tests.
Figure 16B:
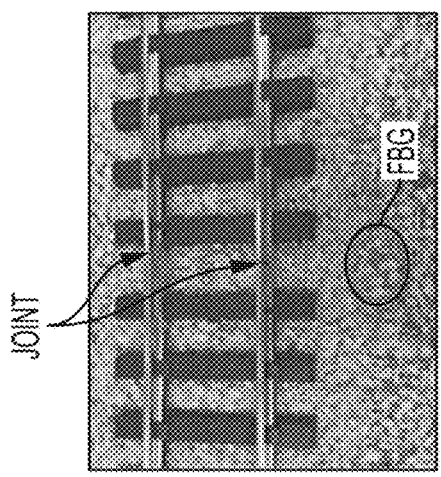
FIG. 16B is a photograph showing the location of the fiber Bragg grating sensor at standoff distance of 2 inches from tracks.
Figure 16A:
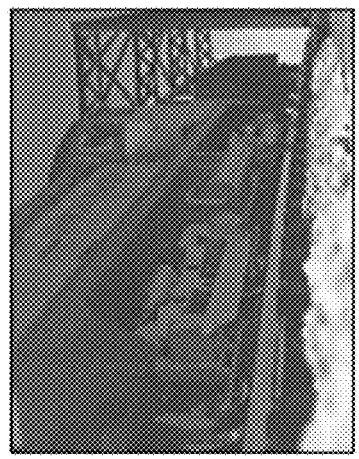
FIG. 16A shows a photograph of the G-scale train going over tracks with a ballast layer.

Fiber Bragg grating (FBG) sensors were placed in the ballast layer at a distance of 2" away from the tracks as shown in FIG. 16A through 16C. The experimental distance of 2" for the experimental model would correspond to a distance of 3.5' in a full-scale train system. FIG. 16A shows a photograph of the G-scale train going over tracks with a ballast layer. FIG. 16B is a photograph showing the location of the fiber Bragg grating sensor at standoff distance of 2" from tracks. FIG. 16C is a photograph showing wear damage in the lower track introduced using a file for controlled damage detection tests. The FBGs were monitored using high-frequency data acquisition as previously discussed and shown in FIG. 13.

Figure 17A:
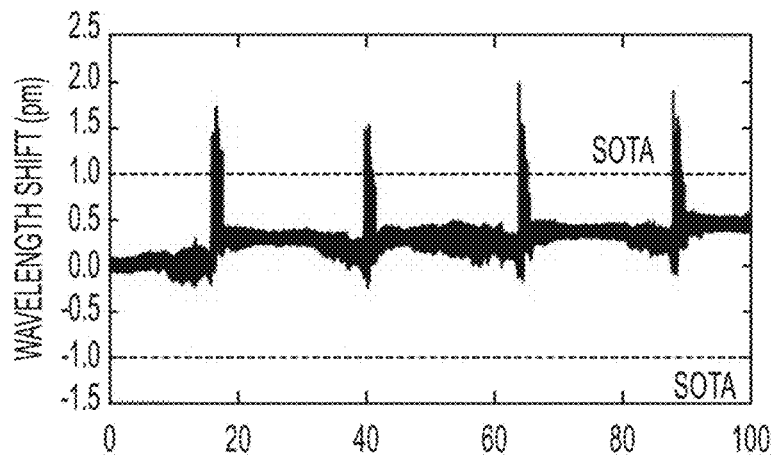
FIGS. 17A through 17F show electrical signals representing vibrational emissions obtained from the monitoring system.
Figure 17B:
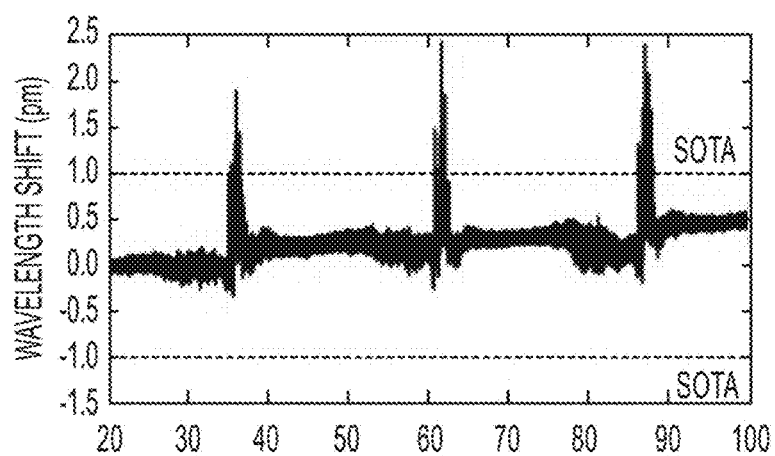
Figure 17C:
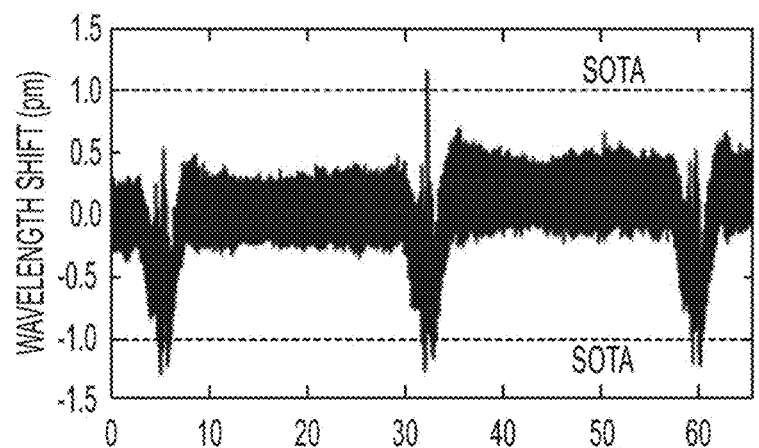
Figure 17D:
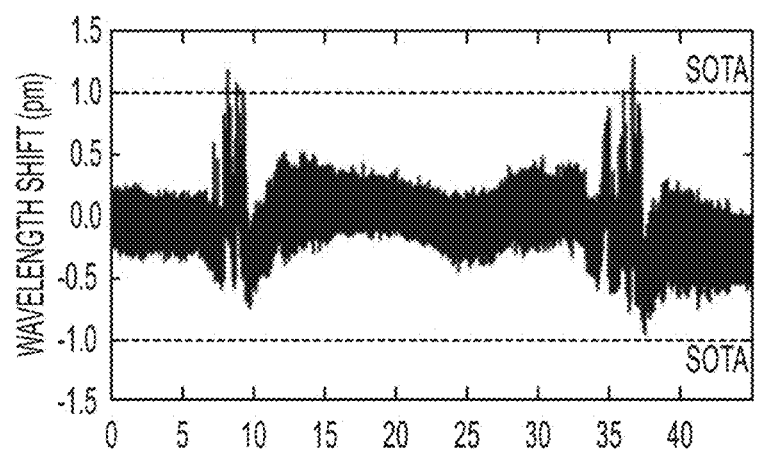
Figure 17E:
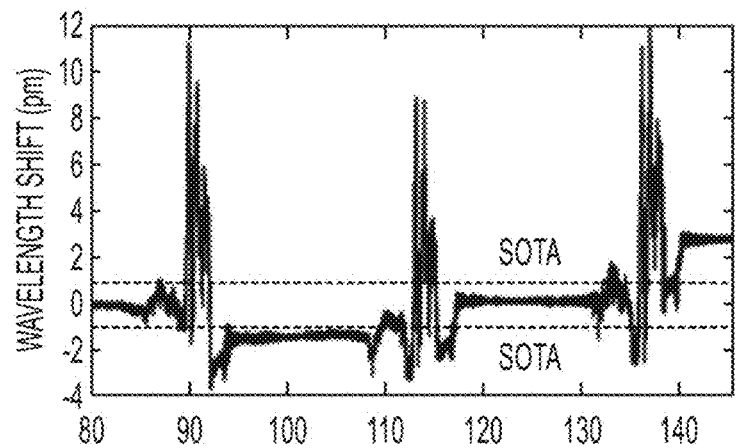
Figure 17F:
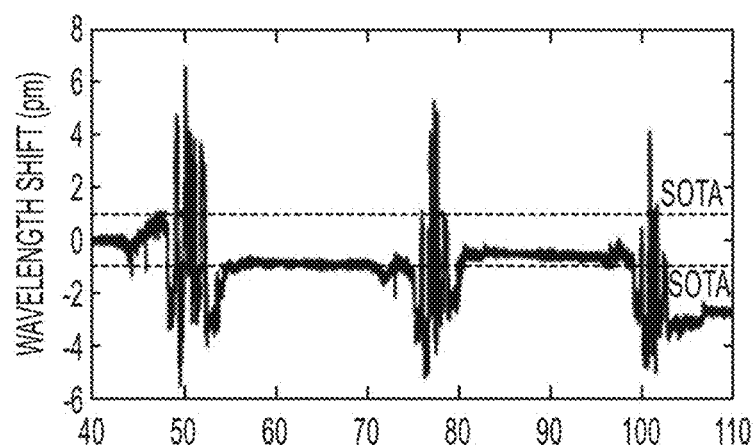

Data was collected from the FBGs under various conditions of loads at different times to collect a representative set of baseline data in undamaged state at a sampling rate of 1 kHz. FIGS. 17A through 17F show electrical signals representing vibrational emission obtained from the monitoring system and FIGS. 18A through 18F show corresponding spectrograms of the vibrational emissions as the train passes over the track. FIGS. 17A and 18A respectively show the high-frequency vibrational emission signal acquired by the monitoring system and the vibrational emission spectrogram for a healthy condition with no load in the carrier wagon. FIGS. 17B and 18B respectively show the high-frequency vibrational emission signal acquired by the monitoring system and the vibrational emission spectrogram for a healthy condition with a load in the carrier wagon. FIGS. 17C and 18C respectively show a zoomed in graph of the high-frequency vibrational emission signal acquired by the monitoring system and the vibrational emission spectrogram for a healthy condition with the no load in the carrier wagon. FIGS. 17D and 18D respectively show the high-frequency vibrational emission signal acquired by the monitoring system and the vibrational emission spectrogram for a rail break simulated by a gap of 2-3 mm between track sections. FIGS. 17E and 18E respectively show the high-frequency vibrational emission signal acquired by the monitoring system and the vibrational emission spectrogram for with wear damage over a section of the lower rack adjacent to the FBG sensor and no load in the carrier wagon. FIGS. 17F and 18F respectively show the high-frequency vibrational emission signal acquired by the monitoring system and the vibrational emission spectrogram for with wear damage over a section of the lower rack adjacent to the FBG sensor and a load in the carrier wagon.

As shown in FIGS. 17A and 18A, the frequency content of the vibrational emission signal is more clustered between 5-50 Hz and 200-500 Hz for this scaled-down train system. The distribution of the frequency content does not change significantly with loading, as shown in FIGS. 17B and 18B or without loading as shown in FIGS. 17C and 18C. In FIGS. 17C and 18C, the signal is zoomed in for reference with the simulated break signal in time domain.

After acquiring data for healthy conditions, three types of damage were separately introduced: i) a small disconnect (2-3 mm) between adjacent track sections to simulate a rail break, ii) light grinding track wear introduced by abrasion with a metal file to simulate rail corrugation, as shown in FIG. 16C without the disconnect introduced earlier between tracks, and iii) a flat spot in the engine wheel to simulate high impact wheels.

As illustrated in FIGS. 17C and 18C, subtle changes in time and frequency domains can be observed for the simulated rail break. A greater number of peaks in the time domain are observed from the wheels as they pass over the rail fracture. For the wear damage mode, the vibrational emission signal is even stronger and the frequency content much broader than in the healthy case (see FIGS. 17E and 18E). Similar results hold when the train is loaded (e.g., FIGS. 17F and 18F) and for the wheel flat damage mode. Pattern matching algorithms applied to this data show about 85% to about 95% accuracy in identifying the load and/or defect conditions with less than about 5% false alarm rates.

Systems, devices, or methods disclosed herein may include one or more of the features, structures, methods, or combinations thereof described herein. For example, a device or method may be implemented to include one or more of the features and/or processes described herein. It is intended that such device or method need not include all of the features and/or processes described herein, but may be implemented to include selected features and/or processes that provide useful structures and/or functionality.

In the above detailed description, numeric values and ranges are provided for various aspects of the implementations described. These values and ranges are to be treated as examples only, and are not intended to limit the scope of the claims. For example, embodiments described in this disclosure can be practiced throughout the disclosed numerical ranges. In addition, a number of materials are identified as suitable for various implementations. These materials are to be treated as exemplary, and are not intended to limit the scope of the claims.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. A monitoring system comprising:
   a plurality of optical sensors arranged in one or more sensor modules of multiple sensors and disposed on one or more fiber optic waveguides, each optical sensor spaced apart from other optical sensors of the plurality of optical sensors and disposed at a location along a route defined by a transportation structure that supports a moveable conveyance as the conveyance moves along the transportation structure, the plurality of optical sensors being mechanically coupled to one or both of the transportation structure and the moveable conveyance, each optical sensor providing an optical output signal responsive to vibrational emissions of one or both of the transportation structure and the conveyance;
   a detector unit configured to convert optical output signals from the optical sensors to electrical signals; and
   a data acquisition controller configured to control application of excitation light to the sensor modules in synchrony with the movement of the conveyance and to synchronize recordation of the electrical signals with movement of the conveyance.

2. The system of claim 1, wherein the data acquisition controller is configured to limit recordation of an electrical signal corresponding to a particular optical sensor signal to a time window during which the conveyance is within a predetermined distance from the location of the optical sensor.

3. The system of claim 1, wherein the data acquisition controller is configured to trigger recordation of the electrical signals when amplitudes of at least two of the electrical signals are above a threshold value.

4. The system of claim 1, wherein the data acquisition controller is configured to determine a speed and a direction of the conveyance and to estimate the time period in which the conveyance is within the predetermined distance of the location of the optical sensor based on the speed and the direction of the conveyance.

5. The system of claim 4, wherein the plurality of optical sensors includes a first set of optical sensors and a second set of optical sensors wherein electrical signals from the first set of optical sensors are used to determine the speed and direction of the conveyance and electrical signals of the second set of sensors include information about an operational state of one or both of the transportation structure and the conveyance.

6. The system of claim 5, wherein the second set of electrical signals include information about cracks, breaks, load level, load distribution, rolling contact fatigue, corrosion, abrasion, wear, and structural buckling of one or both of the transportation structure and the conveyance.

7. The system of claim 1, wherein:
   the optical sensors are arranged in a series configuration along the fiber optic waveguide; and
      each optical sensor is responsive to a different wavelength of excitation light.

8. The system of claim 7, wherein the data acquisition controller is configured to time multiplex the optical signals on the fiber optic waveguide by synchronizing the wavelength of the excitation light with the movement of the conveyance.

9. The system of claim 1, wherein:
   the transportation structure comprises a bridge, a road, a tramway, a railway, or a conveyor belt; and
   the moveable conveyance comprises an automobile, a tram, a train, packages or goods.

10. The system of claim 1, further comprising a wavelength demultiplexer disposed between the sensors and the detector.

11. The system of claim 10, wherein the demultiplexer comprises an arrayed waveguide grating or a linear variable filter.

12. A monitoring system comprising:
   a plurality of optical sensors disposed on one or more fiber optic waveguides and arranged in a series configuration along the fiber optic waveguide, each optical sensor is responsive to a different wavelength of excitation light, spaced apart from other optical sensors of the plurality of optical sensors, and disposed at a location along a route defined by a transportation structure that supports a moveable conveyance as the conveyance moves along the transportation structure, the plurality of optical sensors being mechanically coupled to one or both of the transportation structure and the moveable conveyance, each optical sensor providing an optical output signal responsive to vibrational emissions of one or both of the transportation structure and the conveyance;
   at least one detector configured to convert optical output signals from the optical sensors to electrical signals;
   a data acquisition controller configured to time multiplex the optical signals on the fiber optic waveguide by synchronizing the wavelength of the excitation light with the movement of the conveyance and to synchronize data acquisition from the electrical signals with movement of the conveyance; and
   a processor configured to detect a condition of at least one of the transportation structure and the conveyance based on data acquired from the electrical signals.

13. The system of claim 12, wherein the processor is configured to detect one or more of a crack, break, load level, load distribution, rolling contact fatigue, corrosion, abrasion, wear, and structural buckling of the transportation structure.

14. The system of claim 12, wherein the processor is configured to detect a normal condition of the transportation system.

15. The system of claim 12, wherein the processor includes a library of known templates comprising at least one of one or more signal segments and one or more signal features, each known template characterizing a particular condition of the transportation system and the processor is configured to detect the condition of one or both of the transportation structure and the conveyance by comparing one or more of the electrical signals to at least some of the known signal templates.

16. A method comprising:

receiving optical output signals from a plurality of optical sensors arranged in one or more sensor modules of multiple sensors, each optical sensor disposed at a location along a route defined by a transportation structure that supports a moveable conveyance as the conveyance moves along the transportation structure, the plurality of optical sensors being mechanically coupled to one or both of the transportation structure and the moveable conveyance, each optical output signal responsive to vibrational emissions of one or both of the transportation structure and the conveyance;

converting the optical output signals to electrical signals;

synchronizing recordation of the electrical signals with movement of the conveyance along the transportation structure; and controlling application of excitation light to the sensor modules in synchrony with the movement of the conveyance.

17. The method of claim 16, further comprising detecting a condition of at least one of the transportation structure and the conveyance based on the electrical signals.

18. The method of claim 17, wherein detecting the condition of at least one of the transportation structure and the conveyance comprises pattern matching the electrical signals acquired from the electrical signals to known templates that characterize different conditions of the transportation structure or conveyance.

* * * * *